US012658761B2

(12) United States Patent
Ziegler

(10) Patent No.: US 12,658,761 B2
(45) Date of Patent: *Jun. 16, 2026

(54) MONITORING SYSTEMS FOR SHIPPING CONTAINERS

(71) Applicant: TelemeTrak, Inc., Oakland, CA (US)

(72) Inventor: Frederick Steinway Ziegler, San Francisco, CA (US)

(73) Assignee: TelemeTrak, Inc., Oakland, CA (US)

( * ) Notice: Subject to any disclaimer, the term of this patent is extended or adjusted under 35 U.S.C. 154(b) by 262 days.

This patent is subject to a terminal disclaimer.

(21) Appl. No.: 17/468,326

(22) Filed: Sep. 7, 2021

(65) Prior Publication Data

US 2021/0408870 A1     Dec. 30, 2021

Related U.S. Application Data

(63) Continuation of application No. 16/231,223, filed on Dec. 21, 2018, now Pat. No. 11,133,728.

(51) Int. Cl.
| | |
|---|---|
| H02K 7/18 | (2006.01) |
| F03D 9/25 | (2016.01) |
| F03D 13/20 | (2016.01) |
| H02N 11/00 | (2006.01) |

(52) U.S. Cl.
CPC .............. H02K 7/183 (2013.01); F03D 9/25 (2016.05); F03D 13/20 (2016.05); H02K 7/1823 (2013.01); H02N 11/002 (2013.01)

(58) Field of Classification Search
CPC ........ H02K 7/183; H02K 7/1823; F03D 9/25; F03D 13/20; H02N 11/002

USPC ........................................ 290/44, 55, 3, 5, 39
See application file for complete search history.

(56) References Cited

U.S. PATENT DOCUMENTS

| | | | | |
|---|---|---|---|---|
| 4,753,078 A | * | 6/1988 | Gardner, Jr. ............ | F01K 15/02 60/668 |
| 6,740,988 B2 | * | 5/2004 | Tseng ...................... | F03D 13/20 290/55 |
| 8,299,645 B2 | * | 10/2012 | Muchow ................. | F03D 13/10 290/55 |
| 2008/0231052 A1 | * | 9/2008 | Farmer ..................... | F03D 9/32 290/55 |
| 2008/0296904 A1 | * | 12/2008 | Elahi ....................... | F03D 13/20 290/55 |
| 2009/0267348 A1 | * | 10/2009 | Liebermann .............. | B60L 7/14 123/3 |
| 2010/0140949 A1 | * | 6/2010 | Pitre ....................... | F03D 13/20 290/55 |

(Continued)

*Primary Examiner* — Charles Reid, Jr.

(74) *Attorney, Agent, or Firm* — The Law Office of Raul D. Martinez, PC

(57) ABSTRACT

Interested parties would like to track the location of one or more towed transport platforms continuously when they are in motion. Existing monitoring systems are powered by a combination of solar power, batteries, and intermittent tractor platform power for electrical power. All of these power sources have limitations in providing power when a towed transport platform is in motion. Solar power is not available at night. Batteries run out of energy and must be recharged. Tractor platform power is not always available to a towed transport platform. The embodiments of the invention convert the kinetic energy of a moving towed transport platform into electrical power, providing continuous power for a monitoring system to operate.

11 Claims, 24 Drawing Sheets

| Lux | I[A] | Voltage | Measured Power |
|---|---|---|---|
| 32 | 0.000 | 0.0170 | 0.006 |
| 95 | 0.001 | 0.0420 | 0.036 |
| 220 | 0.001 | 0.0680 | 0.068 |
| 240 | 0.002 | 0.0910 | 0.171 |
| 275 | 0.002 | 0.0750 | 0.116 |
| 300 | 0.001 | 0.0430 | 0.038 |
| 415 | 0.003 | 0.1530 | 0.483 |
| 650 | 0.004 | 0.1850 | 0.708 |
| 665 | 0.007 | 0.3200 | 2.111 |
| 750 | 0.004 | 0.1900 | 0.744 |
| 850 | 0.005 | 0.2800 | 1.789 |
| 960 | 0.005 | 0.2470 | 1.256 |
| 990 | 0.007 | 0.3300 | 2.245 |
| 1,000 | 0.006 | 0.2880 | 1.710 |
| 1,000 | 0.001 | 0.0660 | 0.080 |
| 1,160 | 0.008 | 0.3710 | 2.832 |
| 1,200 | 0.006 | 0.3380 | 1.956 |
| 1,500 | 0.008 | 0.3700 | 2.823 |
| 1,500 | 0.001 | 0.0430 | 0.038 |
| 1,550 | 0.002 | 0.0800 | 0.132 |
| 1,600 | 0.007 | 0.3250 | 2.178 |
| 1,700 | 0.001 | 0.0540 | 0.060 |
| 3,000 | 0.009 | 0.4800 | 4.365 |
| 3,000 | 0.002 | 0.1080 | 0.240 |
| 3,100 | 0.008 | 0.3900 | 3.136 |
| 3,300 | 0.001 | 0.0330 | 0.022 |
| 3,900 | 0.002 | 0.1000 | 0.206 |
| 4,200 | 0.002 | 0.1310 | 0.254 |
| 4,500 | 0.010 | 0.5000 | 5.155 |

| | | | |
|---|---|---|---|
| 5,200 | 0.006 | 0.3040 | 1.905 |
| 6,500 | 0.004 | 0.2000 | 0.825 |
| 7,500 | 0.004 | 0.1800 | 0.868 |
| 7,600 | 0.007 | 0.3800 | 2.672 |
| 8,500 | 0.008 | 0.4000 | 3.299 |
| 9,300 | 0.009 | 0.4350 | 3.902 |
| 9,600 | 0.005 | 0.2300 | 1.091 |
| 11,000 | 0.005 | 0.2600 | 1.384 |
| 11,000 | 0.006 | 0.3040 | 1.905 |
| 19,000 | 0.030 | 1.4800 | 43.951 |
| 20,000 | 0.008 | 0.4200 | 3.299 |
| 24,000 | 0.032 | 1.5600 | 50.177 |
| 24,500 | 0.017 | 0.8200 | 13.864 |
| 30,000 | 0.012 | 0.5900 | 6.936 |
| 35,600 | 0.036 | 1.9000 | 74.433 |
| 36,500 | 0.025 | 1.23 | 31.194 |
| 38,000 | 0.038 | 1.9000 | 74.433 |
| 40,000 | 0.016 | 0.7900 | 12.868 |
| 50,000 | 0.025 | 1.2000 | 29.851 |
| 53,000 | 0.023 | 1.1000 | 24.948 |
| 60,000 | 0.029 | 1.4000 | 40.412 |
| 65,000 | 0.044 | 2.1800 | 95.309 |
| 70,000 | 0.038 | 1.8200 | 68.297 |
| 82,000 | 0.056 | 2.7300 | 153.668 |
| 88,000 | 0.080 | 3.8700 | 308.802 |
| 90,000 | 0.062 | 3.0000 | 185.567 |
| 91,000 | 0.085 | 4.1000 | 346.598 |
| 91,000 | 0.092 | 4.4800 | 410.138 |
| 92,000 | 0.062 | 3.0000 | 185.567 |
| 93,300 | 0.059 | 2.8700 | 169.833 |

(56)  References Cited

U.S. PATENT DOCUMENTS

| | | | |
|---|---|---|---|
| 2010/0270810 A1* | 10/2010 | Liebermann ............ | B60L 55/00 |
| | | | 123/3 |
| 2011/0156396 A1* | 6/2011 | Cleveland ................. | F03G 7/08 |
| | | | 290/55 |
| 2011/0198856 A1* | 8/2011 | Ling ...................... | B60K 16/00 |
| | | | 74/DIG. 9 |
| 2014/0001760 A1* | 1/2014 | Hembree ................ | B60L 8/006 |
| | | | 290/52 |
| 2015/0240786 A1* | 8/2015 | Dietzel ................... | F03D 15/10 |
| | | | 290/44 |
| 2015/0337809 A1* | 11/2015 | Jordan, Sr. ............. | H02S 10/12 |
| | | | 290/55 |
| 2022/0224264 A1* | 7/2022 | Shine ...................... | H02J 3/381 |

* cited by examiner

| Lux | I [A] | Voltage | Measured Power |
|---|---|---|---|
| 32 | 0.000 | 0.0170 | 0.006 |
| 95 | 0.001 | 0.0420 | 0.036 |
| 220 | 0.001 | 0.0580 | 0.069 |
| 240 | 0.002 | 0.0910 | 0.171 |
| 275 | 0.002 | 0.0750 | 0.116 |
| 300 | 0.001 | 0.0430 | 0.038 |
| 415 | 0.003 | 0.1530 | 0.483 |
| 650 | 0.004 | 0.1850 | 0.706 |
| 695 | 0.007 | 0.3200 | 2.111 |
| 750 | 0.004 | 0.1900 | 0.744 |
| 850 | 0.005 | 0.2500 | 1.289 |
| 960 | 0.005 | 0.2470 | 1.258 |
| 990 | 0.007 | 0.3300 | 2.245 |
| 1,000 | 0.006 | 0.2880 | 1.710 |
| 1,000 | 0.001 | 0.0660 | 0.090 |
| 1,160 | 0.008 | 0.3710 | 2.838 |
| 1,200 | 0.006 | 0.3080 | 1.956 |
| 1,500 | 0.008 | 0.3700 | 2.823 |
| 1,500 | 0.001 | 0.0430 | 0.038 |
| 1,590 | 0.002 | 0.0800 | 0.132 |
| 1,600 | 0.007 | 0.3250 | 2.178 |
| 1,700 | 0.001 | 0.0540 | 0.060 |
| 3,000 | 0.009 | 0.4600 | 4.363 |
| 3,000 | 0.002 | 0.1080 | 0.240 |
| 3,100 | 0.008 | 0.3900 | 3.136 |
| 3,300 | 0.001 | 0.0330 | 0.022 |
| 3,900 | 0.002 | 0.1000 | 0.206 |
| 4,200 | 0.002 | 0.1110 | 0.254 |
| 4,500 | 0.010 | 0.5000 | 5.155 |

FIG. 1A

| | | | |
|---|---|---|---|
| 5,200 | 0.006 | 0.3040 | 1.905 |
| 6,500 | 0.004 | 0.2000 | 0.825 |
| 7,500 | 0.004 | 0.1800 | 0.668 |
| 7,600 | 0.007 | 0.3600 | 2.672 |
| 8,500 | 0.008 | 0.4000 | 3.299 |
| 9,300 | 0.009 | 0.4350 | 3.902 |
| 9,800 | 0.005 | 0.2300 | 1.091 |
| 11,000 | 0.005 | 0.2600 | 1.394 |
| 11,000 | 0.006 | 0.3040 | 1.905 |
| 19,000 | 0.030 | 1.4600 | 43.951 |
| 20,000 | 0.008 | 0.4000 | 3.299 |
| 24,000 | 0.032 | 1.5600 | 50.177 |
| 24,500 | 0.017 | 0.8200 | 13.864 |
| 30,000 | 0.012 | 0.5800 | 6.936 |
| 35,600 | 0.039 | 1.9000 | 74.433 |
| 36,500 | 0.025 | 1.23 | 31.194 |
| 38,000 | 0.039 | 1.9000 | 74.433 |
| 40,000 | 0.016 | 0.7900 | 12.868 |
| 50,000 | 0.025 | 1.2000 | 29.691 |
| 53,000 | 0.023 | 1.1000 | 24.948 |
| 60,000 | 0.029 | 1.4000 | 40.412 |
| 69,000 | 0.044 | 2.1500 | 95.309 |
| 70,000 | 0.038 | 1.8200 | 68.297 |
| 82,000 | 0.056 | 2.7300 | 153.668 |
| 88,000 | 0.080 | 3.8700 | 308.802 |
| 90,000 | 0.062 | 3.0000 | 185.567 |
| 91,000 | 0.085 | 4.1000 | 346.598 |
| 91,000 | 0.092 | 4.4600 | 410.136 |
| 92,000 | 0.062 | 3.0000 | 185.567 |
| 93,300 | 0.059 | 2.8700 | 169.833 |

MONITORING SYSTEMS FOR SHIPPING CONTAINERS

CLAIM OF PRIORITY

The present application claims priority to U.S. patent application Ser. No. 16/231,223, entitled "Machine and method for generating electrical power from the motion of a moving towed transport platform" and filed Dec. 21, 2018, which is assigned to the assignee hereof and hereby expressly incorporated by reference in its entirety.

FEDERALLY SPONSORED RESEARCH

Not applicable to this application.

SEQUENCE LISTING OR PROGRAM

Not applicable to this application.

BACKGROUND OF THE INVENTION

Prior Art

Interested parties seek to utilize monitoring systems to track unpowered towed transport platforms such as trailers and chassis. Numerous such monitoring systems exist, such as the Orbcomm GT-1100, which offers monitoring hardware and services for trailers. These services may include GPS tracking, detecting the connection and disconnection of a trailer to and from a tractor platform, respectively, the loading and unloading of an intermodal container onto and from a chassis, respectively, and the opening and closing of doors, motion start/stop detection, heartbeat reporting, and cellular network jamming detection. Communications between a monitoring system and a server are implemented using cellular or combined satellite-cellular communications. The GT-1100 may incorporate a 3-axis accelerometer, four 16-bit A/D converters, one CAN bus interface, four GPIOs, one RS-232 serial interface, one RS-485 serial interface, and/or one USB interface. Power for the GT-1100 is provided by a solar panel and rechargeable battery, wherein the solar panel recharges the battery when exposed to adequate sunlight. The solar panel, battery, and electronics are all incorporated into a single physical unit.

On solar-powered monitoring systems, such as the GT-1100, the solar panel or solar panels must receive enough sunlight, whether direct or indirect, to charge the unit's battery. On a standard dry-van trailer, where the rectangular structure enclosing the cargo is a part of the trailer, a solar-powered monitoring system may be installed on the top of the trailer enclosure where it is elevated, has a clear view of the sky and is exposed to direct sunlight during sunny days under most circumstances. In this configuration, a GT-1100 may generate sufficient power to charge the battery adequately for operation.

However, this configuration does not work well on chassis. Chassis are specialized trailers designed to carry intermodal containers, which are typically loaded onto and then detached from a given chassis for a single trip, after which another intermodal container is loaded for the next trip, and so on. Mounting a solar-powered monitoring system on top of an intermodal container is not a viable solution for monitoring a particular chassis since the loaded intermodal container does not remain constant. The owners and renters of chassis often seek to monitor their chassis rather than the loaded intermodal containers.

On many chassis, the intermodal container or containers loaded onto them cover most or all of the top of the chassis. Thus, if a solar-powered monitoring system is mounted on a chassis facing the sky, the sky is completely obscured when an intermodal container is loaded onto it. On some chassis the entire frame of the chassis is covered by a loaded intermodal container and there is no place to mount a solar-powered monitoring system on the chassis frame that has an unobscured view of the sky when an intermodal container is loaded. On other chassis, the only horizontal portion that may not be completely covered by a loaded intermodal container is in the front area where the chassis is hitched to the tractor platform that tows it. The view of the sky in this area is highly obscured by the loaded intermodal container in the rear and the towing tractor platform cab in the front. After empirical testing, a chassis leasing company could find no mounting location on multiple chassis for a GT-1100 solar-powered monitoring system that resulted in chassis monitoring reliable enough to resell to their customers.

Two other monitoring system problems are misuse and theft. A skyward-facing solar-powered monitoring system mounted on a chassis is easily spotted by a person on the ground. Sometimes, a tractor platform driver towing a chassis may wish to make an unauthorized stop or take an unauthorized route, or thieves may wish to steal the chassis, possibly with its cargo. If a monitoring system is easily spotted then a driver or thief may remove it to obscure the misuse or theft of the chassis. Empirical testing by a chassis leasing company over a two year period has demonstrated that a GT-1100 mounted in non-obvious locations within a chassis frame does not generate enough power for reliable operation.

A scientific analysis of solar power generation may shed some light on this problem. Light illuminance is measured in lux in SI units of $lm/m^2$ and in foot-candles in SAE units of $lm/ft^2$. From the Wikipedia page on lux: "The lux is one lumen per square [meter]($lm/m^2$), and the corresponding radiometric unit, which measures irradiance, is the watt per square [meter] ($W/m^2$). There is no single conversion factor between $1\times$ and $W/m^2$; there is a different conversion factor for every wavelength, and it is not possible to make a conversion unless one knows the spectral composition of the light." Since a given solar panel has a fixed area, the power (in watts) contained in daylight striking a solar panel is directly proportional to its illuminance in lux.

According to "Recommended Light Levels (Illuminance) for Outdoor and Indoor Venues," a document published by the National Optical Astronomy Observatory, the illuminances for different outdoor lighting conditions are as follows:

| Illumination | | | |
|---|---|---|---|
| Condition | [foot-candles] | [lux] | [lux](rounded) |
| Sunlight | 10,000 | 107,527 | ~100,000 |
| Full Daylight | 1,000 | 10,752 | ~10,000 |
| Overcast Day | 100 | 1,075 | ~1,000 |
| Very Dark Day | 10 | 107 | ~100 |
| Twilight | 1 | 10.8 | ~10 |
| Deep Twilight | 0.1 | 1.08 | ~1 |
| Full Moon | 0.01 | 0.108 | ~0.1 |
| Quarter Moon | 0.001 | 0.0108 | ~0.01 |
| Starlight | 0.0001 | 0.0011 | ~0.001 |
| Overcast Night | 0.00001 | 0.0001 | ~0.0001 |

The "[lux](rounded)" values were added in order to simplify this analysis. According to these guidelines, a GT-1100 mounted on the inside of a chassis frame might receive between 1,000 lux and 10,000 lux on a sunny day whereas one mounted on the top of a dry-van trailer should receive between 10,000 lux and 100,000 lux. Clearly, a solar panel mounted with an unobscured view of the sky will receive more power than one not in direct daylight.

The following experiment was performed to directly measure the power generated by a solar panel in varying illuminances. The light sensor for a lux meter (model: Dr. meter LX1010B Digital Illuminance/Light Meter, 0-100,000 Lux Luxmeter) was affixed to the flat surface of a ruler and a solar panel (model: Seeed Studio 313070004 0.5 W 55 mm×70 mm) was affixed adjacent to it on the ruler and facing in the same direction, such that the light received by each unit was virtually the same as that received by the other. The solar panel electrical leads were connected to either end of a 48.5Ω resistor. A series of 59 lux meter and voltage readings across the resistor was made in varying light conditions. The current and power generated in each reading were calculated using Ohm's law (I=V/R) and the power equation (P=I^2×R=V×I), respectively. The full data set is shown in FIG. 1. A summary of the results is as follows:

| Power Generated [mW] | | | | |
| --- | --- | --- | --- | --- |
| Illuminance Range [lux] | Min | Max | Average | Approximate Condition |
| 32-95 | 0.006 | 0.036 | 0.021 | low light (indoors) |
| 220-990 | 0.069 | 2.245 | 0.839 | low light (indoors) |
| 1,000-9,800 | 0.022 | 5.155 | 1.720 | outdoors in shadow |
| 11,000-24,500 | 1.091 | 50.18 | 16.53 | full daylight with view of the sky |
| 30,000-93,300 | 6.936 | 410.1 | 130.5 | direct sunlight |

This experiment demonstrates that this solar panel generates nearly ten times as much power from full daylight as from in shadow and about 70 times as much power from direct sunlight as from in shadow. The power generated by this solar panel varies roughly linearly with the logarithm of the illuminance. If this solar panel were mounted within a chassis frame with an intermodal container on top, it would likely receive illuminance in the 1,000 lux to 10,000 lux range during daylight, providing between 1.4% and 10% of the power it would generate if mounted with an unobstructed view of the sky. This experiment suggests that the reason the GT-1100 was not able to provide adequate monitoring services when mounted on chassis is that its solar panel could not receive enough light to produce adequate electrical power.

There are several methods for connecting a tractor platform's electrical system to a trailer or chassis, including four-, five, six, and seven plug adapters. Typically, these plugs complete several circuits including the trailer or chassis brake lights and running lights. The brake light circuit only receives tractor platform power when the tractor platform brakes are applied and the running lights only receive power when the running lights are turned on in the tractor platform. During an informal survey of chassis being towed on U.S. Interstate 880 near the Port of Oakland, California during daylight hours, numerous chassis were observed with no taillights illuminated. Many of these connector systems include an auxiliary power connector, but tractor platform operators may not power this in order to prevent the tractor platform battery from being run down by connected trailer equipment. Companies that lease trailers or chassis to trucking companies no control over whether or not the running lights are powered in daytime and no control over whether or not the auxiliary power connector is powered. It appears that there is not a reliable power source that is always available to a towed transport platform from the tractor platform to which it is hitched, even when it is running. A survey of trailer tracking devices from vendors Orbcomm, Blackberry, Spireon, Zonar, and SkyBitz shows that none of these vendors' tracking devices relies exclusively on power provided by the tractor platform, which suggests that the market has decided that this is not a reliable source of power.

A party interested in monitoring a towed transport platform is likely more interested in continuously monitoring its position when in motion than when it is stationary. Solar-charged batteries, including those on the GT-1100, are capable of waking up periodically and reporting their position. However, they do not provide adequate power for continuous monitoring. The advertised reporting frequencies of solar-battery monitoring systems typically range from once every five minutes to once per day.

BRIEF SUMMARY OF THE INVENTION

One solution to the problem of powering electronics such as monitoring systems on a towed transport platform when in motion is to harvest the kinetic energy intrinsic to the motion. The are two major sources of energy available when a towed transport platform is in motion: airflow and wheel rotation. Lesser sources of energy include the periodic motions from vibration and swaying when in motion. One way to convert airflow and wheel rotation into electrical power is via a dynamo. A dynamo converts kinetic mechanical energy into electrical power.

A towed transport platform in motion experiences airflow in nearly all conditions. One way to harness airflow energy is for the airflow to turn a turbine that drives an electric generator. In one embodiment, a turbine is "a mill or machine operated by the wind usually acting on oblique vanes or sails that radiate from a horizontal shaft."

An experiment was performed to quantify the electrical power generated by airflow turning a turbine and driving an electric generator. A DC electric motor may be used as an electric generator by turning its shaft to generate electrical power. A propeller turning the shaft of a DC electric motor is an example of a turbine turning and driving an electric generator. Using a hobby kit containing four propellers (turbines) and three DC electric motors (generators), a "Delinx Homemade DIY Project Kits: DC Motors, Gears, propellers, AA Battery case, Cables, on/Off Switch, 9V Battery Clip", an apparatus was build to test how much electrical power was generated by multiple turbine/generator combinations at different airspeeds. Each combination of one of four turbines and one of three generators was tested wherein one turbine was mounted on the shaft of one generator. For each turbine/generator combination, the electrical leads of the generator were connected to either end of a 23.7Ω resistor's leads. A voltmeter was also connected across the resistor to measure the voltage produced at each airspeed. Using Ohm's law (I=V/R) and the power equation (P=I^2×R=V×I), the current and power generated, respectively, were calculated. The apparatus was held out the open window of an automobile driving on a street and the voltages recorded at 20 MPH, 30 MPH, and 40 MPH. The experiment was performed in both the North and South directions on the same street to provide some compensation for prevailing wind bias. The turbine that produced the most power in this experiment measured less than 2 inches in diameter. The results for the turbine/generator combination that produced the highest electrical power follow:

| Speed [MPH] | Bearing | Voltage [V] | Current [A] | Power [W] |
| --- | --- | --- | --- | --- |
| 20 | South | 3.6 | 0.152 | 0.547 |
| 20 | North | 4.5 | 0.190 | 0.854 |
| 30 | South | 6.5 | 0.274 | 1.783 |
| 30 | North | 7.5 | 0.316 | 2.373 |
| 40 | South | 10.0 | 0.422 | 4.219 |
| 40 | North | 10.0 | 0.422 | 4.219 |

Creating a linear regression model of this data yields the linear equation: Power=0.175925×Speed−2.94525 watts. According to this equation, this turbine/generator combination produces 1 watt of electrical power at 22.43 MPH and 0.85 watts of electrical power at 21.57 MPH.

At highway speeds, the apparatus tested provides electrical power at an order of magnitude sufficient to power a microprocessor-based monitoring system. For example, the Raspberry Pi Zero W is a microprocessor-based computer that consumes 0.5 W when idle. Empirical testing has shown that a Raspberry Pi Zero W connected to a USB GPS module, the "Diymall Vk-172 vk 172 Gmouse G-mouse Usb Gps Dongle Glonass Support Windows 10/8/7/vista/XP Raspberry PI B+3 Vehicle Aviation Tracker" and running software that logs GPS readings at 1 Hz consumes a continuous 0.85 W (170 mA at 5V).

Besides logging GPS data, a monitoring system may need to transmit this data, a subset of it, or other data to a server on a periodic basis. One means for performing such transmissions is a cellular modem. An example of a cellular modem is the SIMCom SIM808. According to page 20 of a SIM808 specification, "SIM800_Hardware Design_V1.08", the SIM808 power requirement is as follows: "The power supply range of SIM800 is from 3.4V to 4.4V. Recommended voltage is 4.0V. The transmitting burst will cause voltage drop and the power supply must be able to provide sufficient current up to 2 A." Thus, the SIM808 requires a maximum of 2 A at 4.0V, or 8.0 W, to transmit. According to the linear equation above, the best turbine/generator combination provides 8.85 W (8.0 W for continuous cellular modem transmission+0.85 W for continuous GPS logging) at 67.0 MPH. Two turbine/generator combinations generating electrical power in parallel would generate 8.85 W at 33.5 MPH, three at 22.3 MPH, four at 16.8 MPH, etc. Thus, it is feasible to generate adequate power for continuous GPS logging and periodic cellular transmissions using one or more turbine/generator combinations on a moving towed transport platform at speeds regularly experienced on roadways.

Empirical tests were performed where a Raspberry Pi 3 B+ was communicably coupled to a SIM808 cellular modem and successfully transmitted to a web server from which it retrieved the text of an HTML web page. The Raspberry Pi 3 B+ runs the same operating system and uses an identical electronic interface to the SIM808 as the Raspberry Pi Zero W, and the two are functionally identical for the purposes of this experiment. Testing showed that simple messages were transmitted within 10 seconds. Drawing 8.0 W for 10 seconds requires 80 J of energy. In the turbine/generator experiment detailed above, the optimal turbine/generator would generate 80 J of energy in 80 seconds at 22.43 MPH.

In order to provide continuous tracking and periodic transmissions when the available kinetic energy is inadequate, such as when a towed transport platform is in slow traffic, stopped at intersections, etc., the excess electrical power generated at higher speeds may be converted to potential energy and stored in an energy storage device from which it can be converted back to electrical power when needed. Examples of energy storage devices include batteries, capacitors, flywheels, and springs.

In one embodiment, the power generation system for such a monitoring system includes one or more turbines driving one or more generators. In one embodiment, the power system for such a monitoring system includes one or more energy storage devices such as one or more capacitors, flywheels, batteries, springs, or other energy storage devices, which store excess energy for use when the power generation system does not produce adequate power. This may be the case when the towed transport platform is moving at low speeds or when stationary.

BRIEF DESCRIPTION OF THE DRAWINGS

FIGS. 1A-1B are tables showing Lux, voltage, current and power readings in varying light conditions.

FIG. 7 shows the direction of a tractor platform coupling with and uncoupling from a chassis.

REFERENCE NUMERALS

Figure 2:
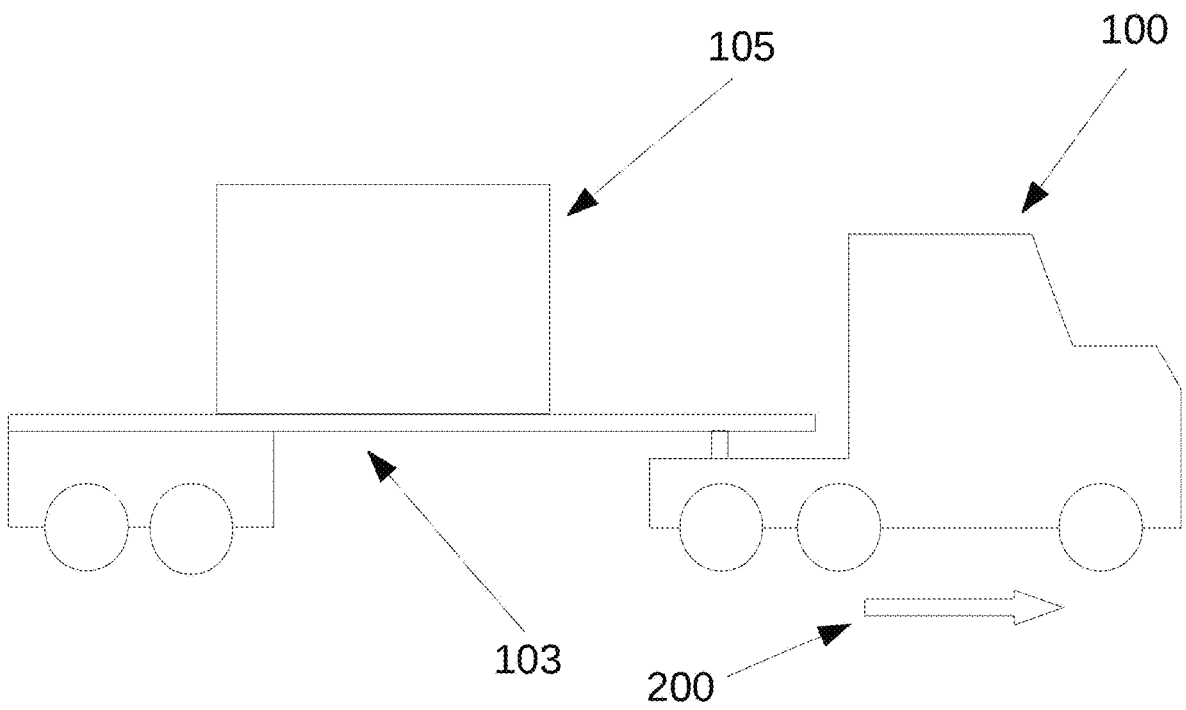
FIG. 2 shows a tractor platform towing a towed transport platform carrying a load. The right arrow shows the direction of towing.
Figure 3:
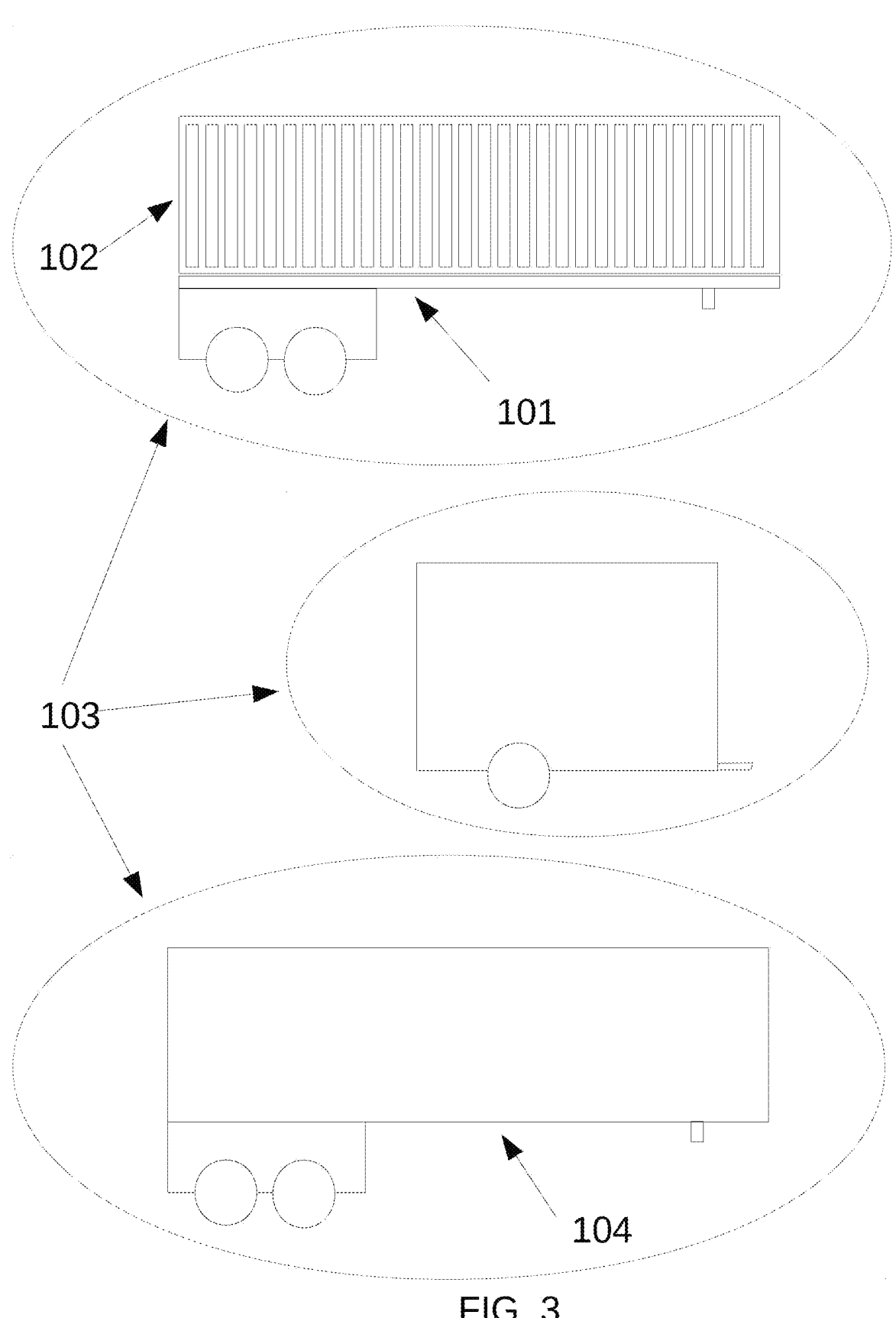
FIG. 3 shows three embodiments of a towed transport platform, including a chassis carrying an intermodal container, a car trailer, and a dry-van trailer.
Figure 4:
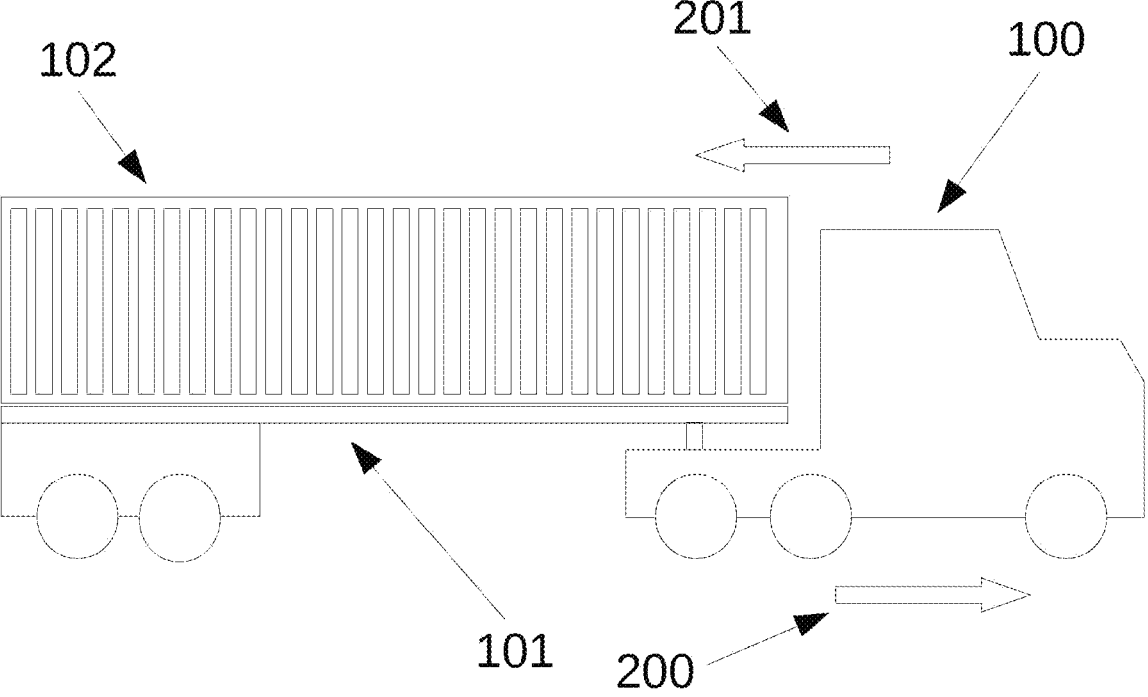
FIG. 4 shows a tractor platform towing a chassis carrying an intermodal container. The right arrow shows the direction of towing, and the left arrow shows the direction of the resulting airflow.
Figure 5:
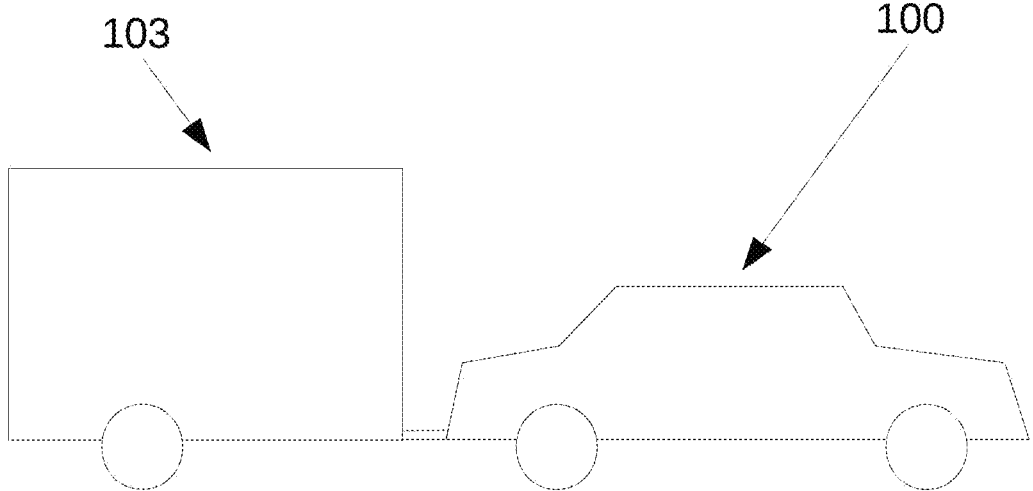
FIG. 5 shows a tractor platform towing a towed transport platform. Here, the tractor platform is an automobile, and the towed transport platform is a car trailer.
Figure 6:
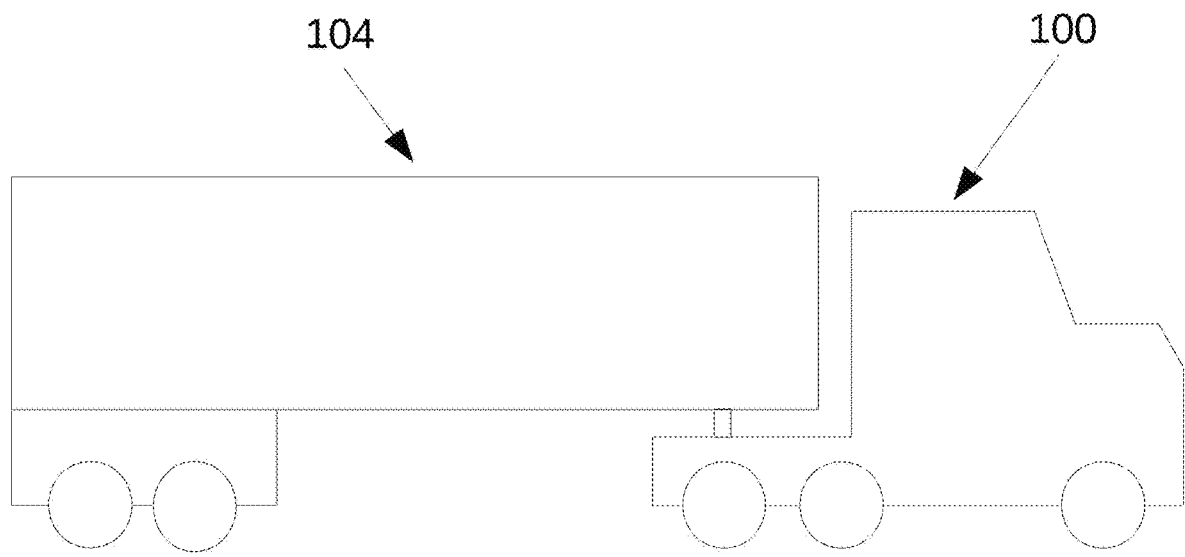
FIG. 6 shows a tractor platform towing a dry-van trailer, where the rectangular structure enclosing the cargo is an integral part of the trailer.
Figure 7:
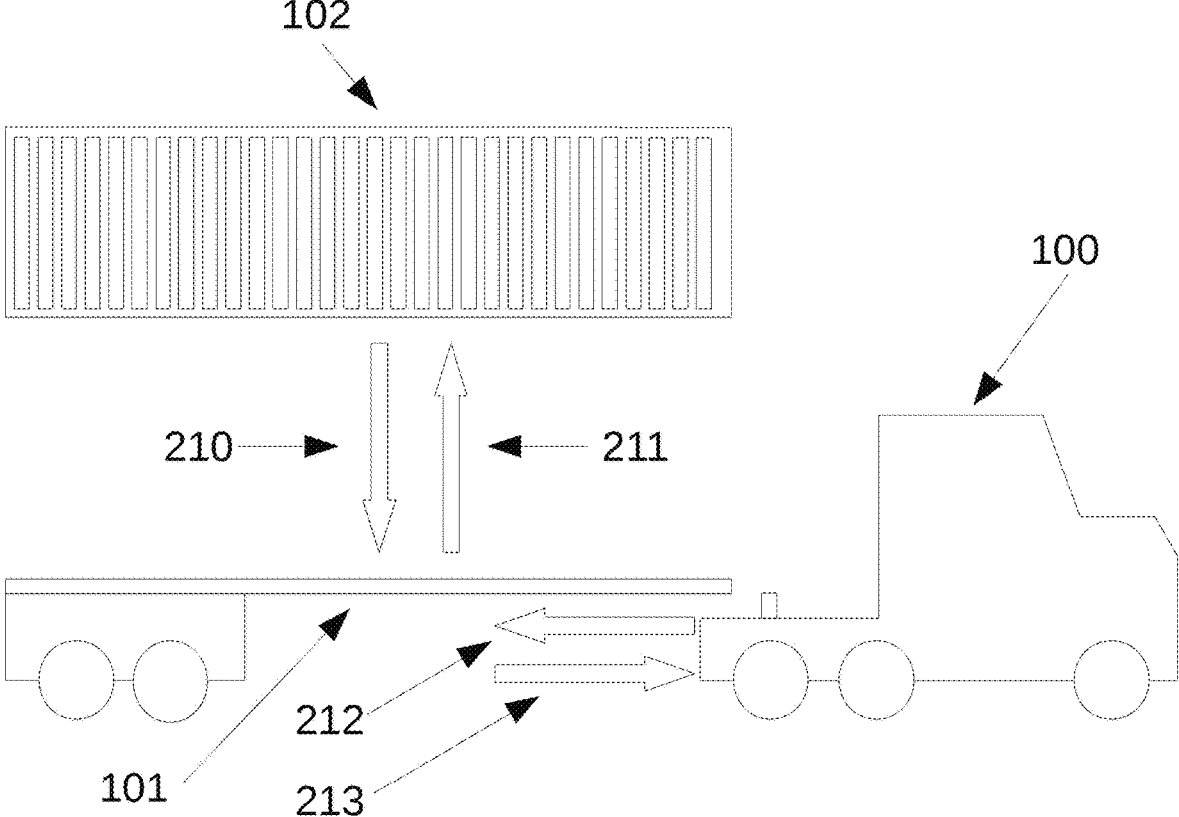
FIG. 7 shows the direction of loading an intermodal container onto a chassis and the direction of unloading an intermodal container off of a chassis. In addition.
Figure 8:
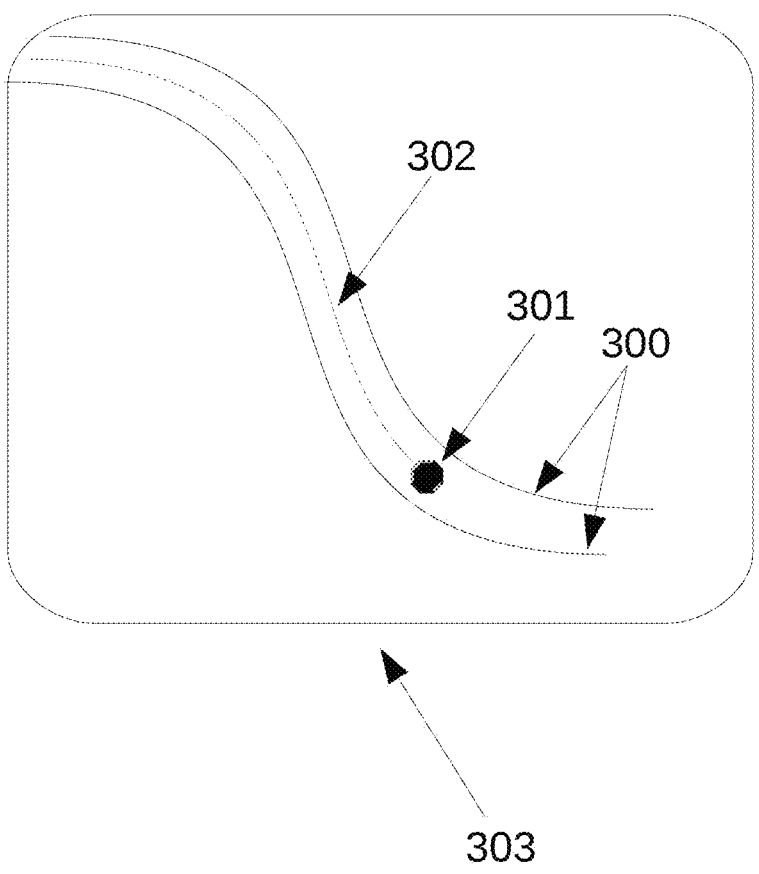
FIG. 8 shows a monitoring system view of the geolocation of a towed transport platform as it moves down a roadway, including the path taken. The view is framed within a user interface display.
Figure 9:
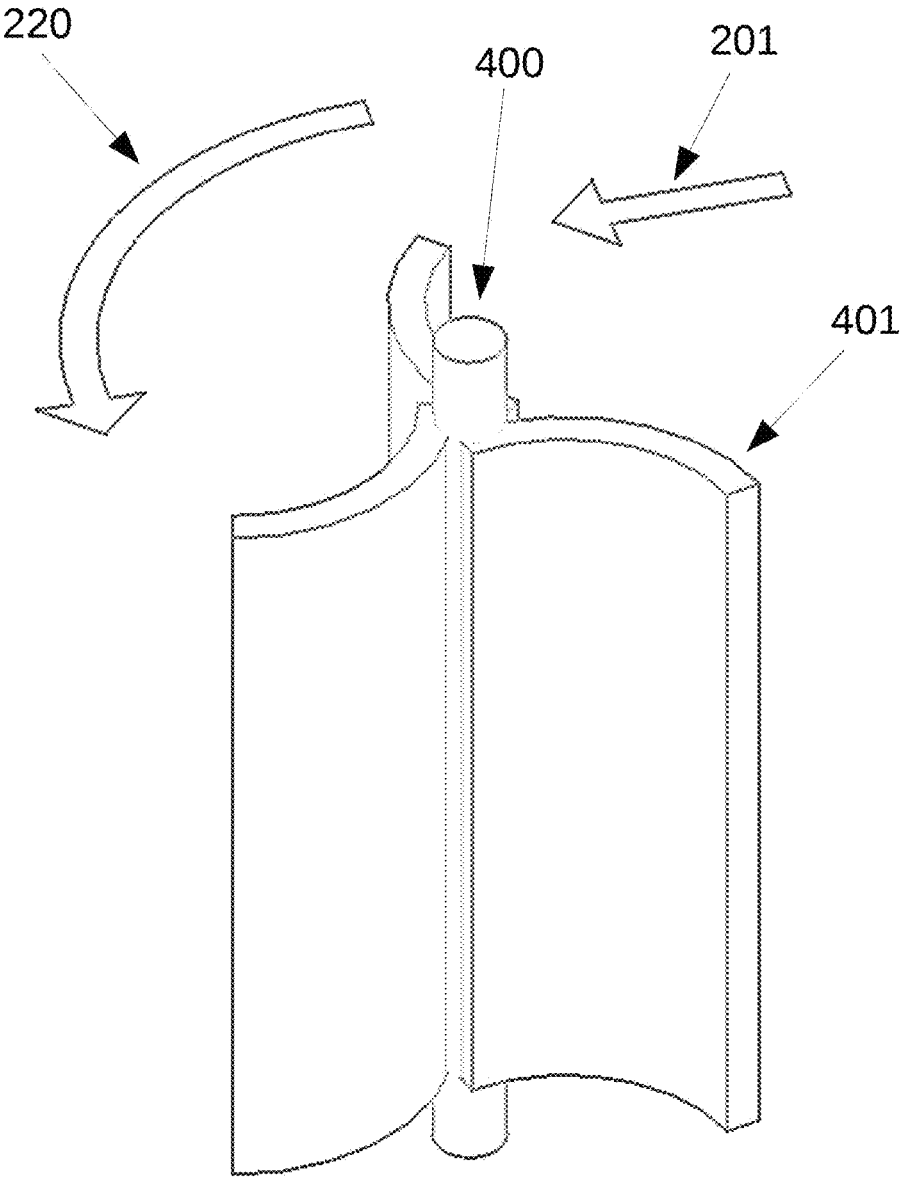
FIG. 9 shows a turbine mounted on a shaft that is rotating due to airflow. The direction of the airflow and the turbine's rotation are shown. A turbine whose axis of rotation is oriented substantially perpendicular to the direction of motion of airflow is known as a cross-flow turbine.
Figure 10:
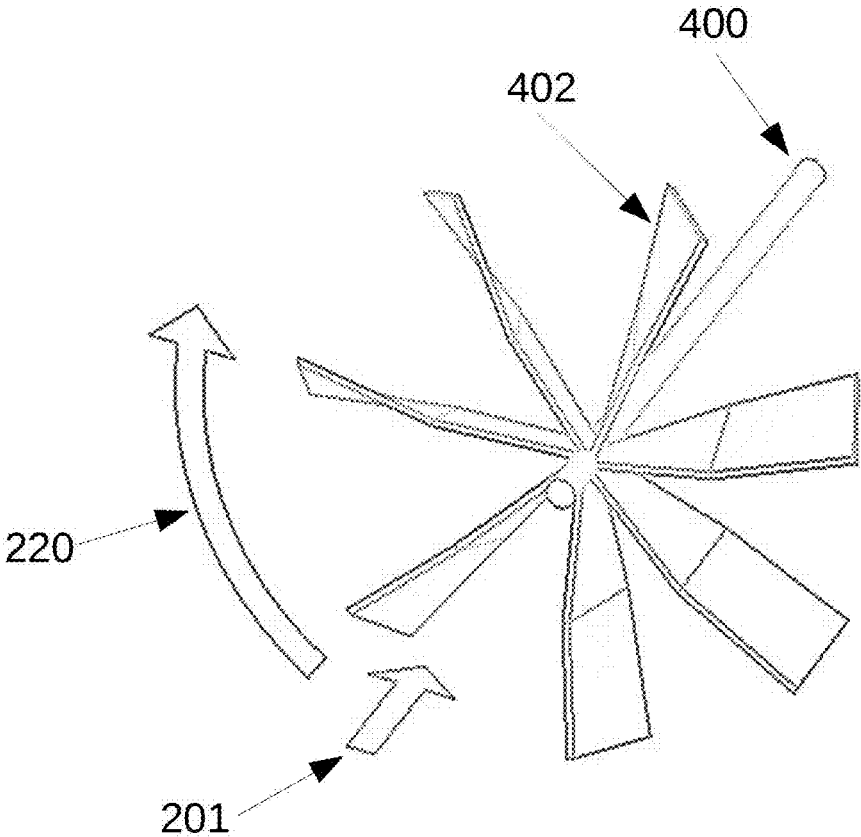
FIG. 10 shows a turbine mounted on a shaft that is rotating due to airflow. The direction of the airflow and the turbine's rotation are shown. A turbine whose axis of rotation is oriented substantially parallel to the direction of motion of airflow is known as an axial turbine.
Figure 11:
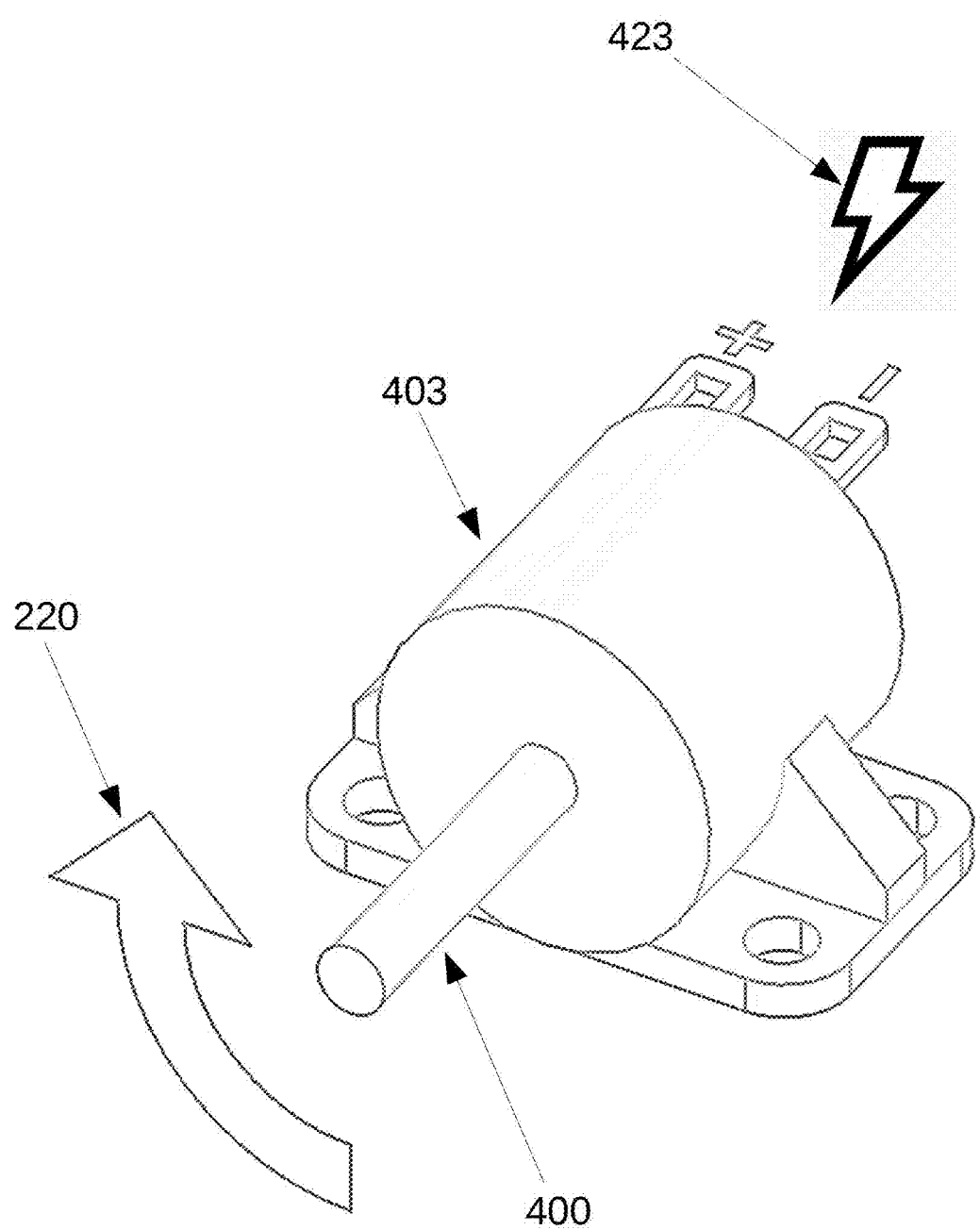
FIG. 11 shows an electric generator and its shaft, with a rotation direction shown. The electric generator generates electrical power when its shaft rotates.
Figure 12:
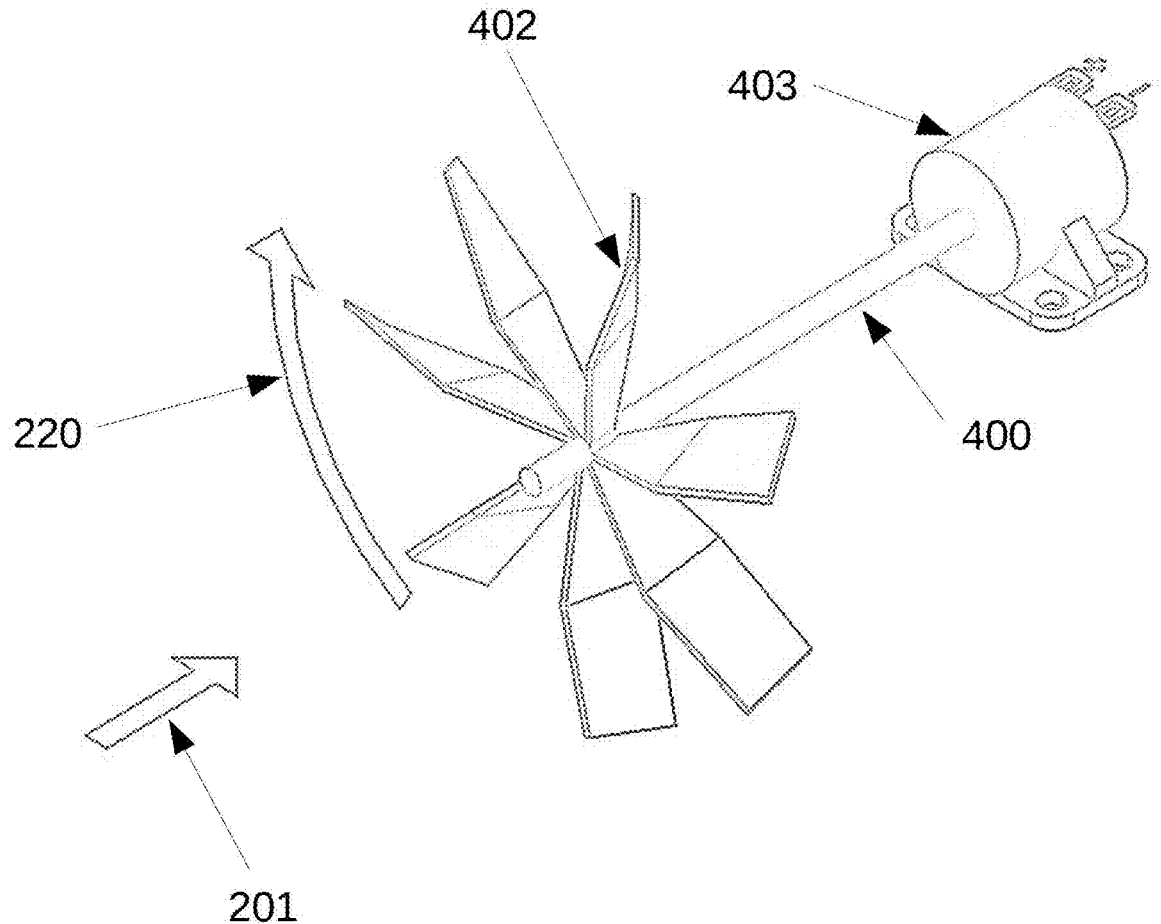
FIG. 12 shows a turbine physically coupled to a shaft that is physically coupled to an electric generator. The airflow causes the turbine and shaft to rotate, which causes the electric generator to generate electrical power.
Figure 13:
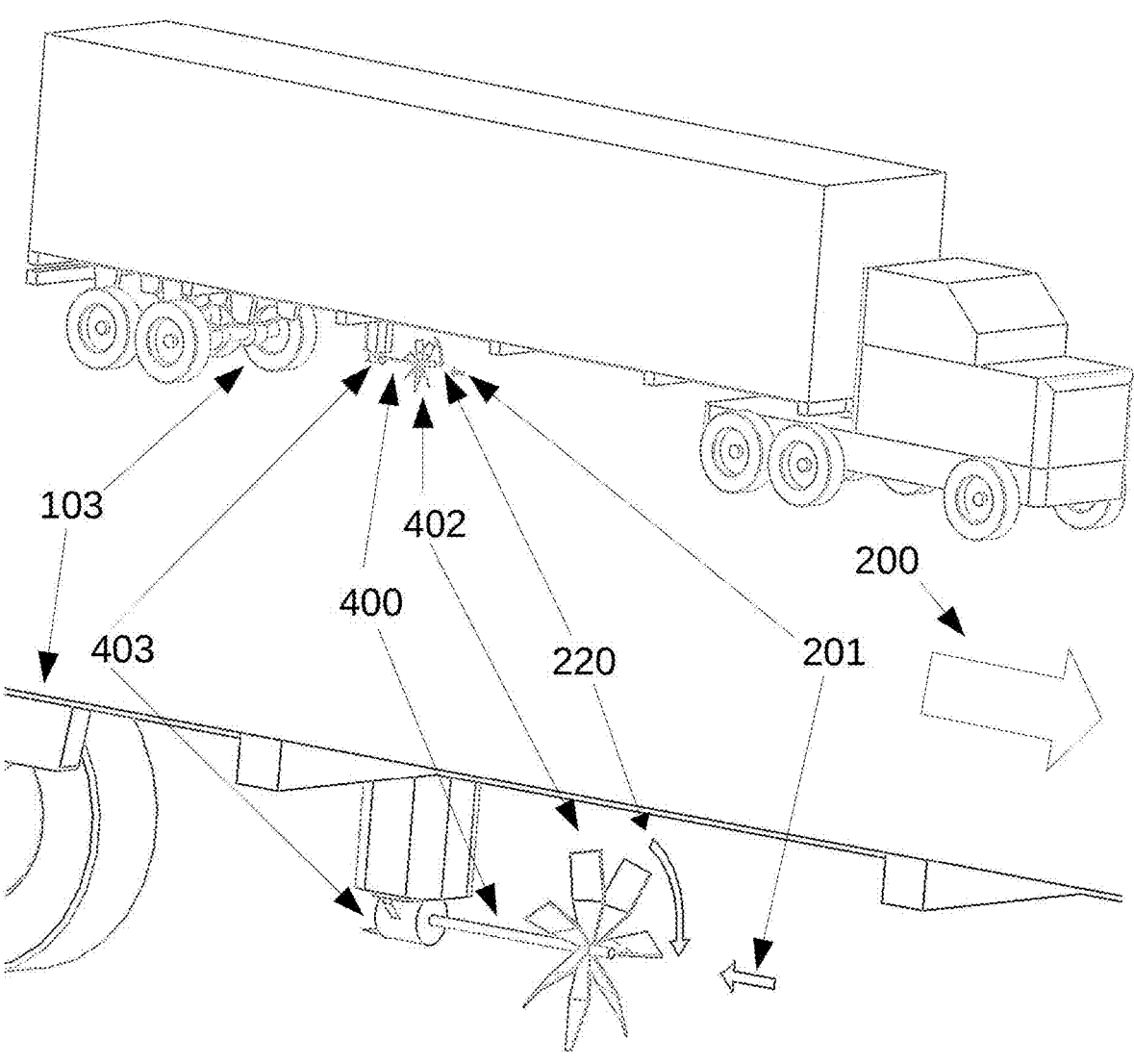
FIG. 13 shows a turbine, shaft, and electric generator physically coupled to a towed transport platform. The lower portion of the figure is a magnified view of the turbine assembly in the upper portion. The airflow resulting from forward motion causes the turbine and shaft to rotate, which causes the electric generator to generate electrical power.
Figure 14:
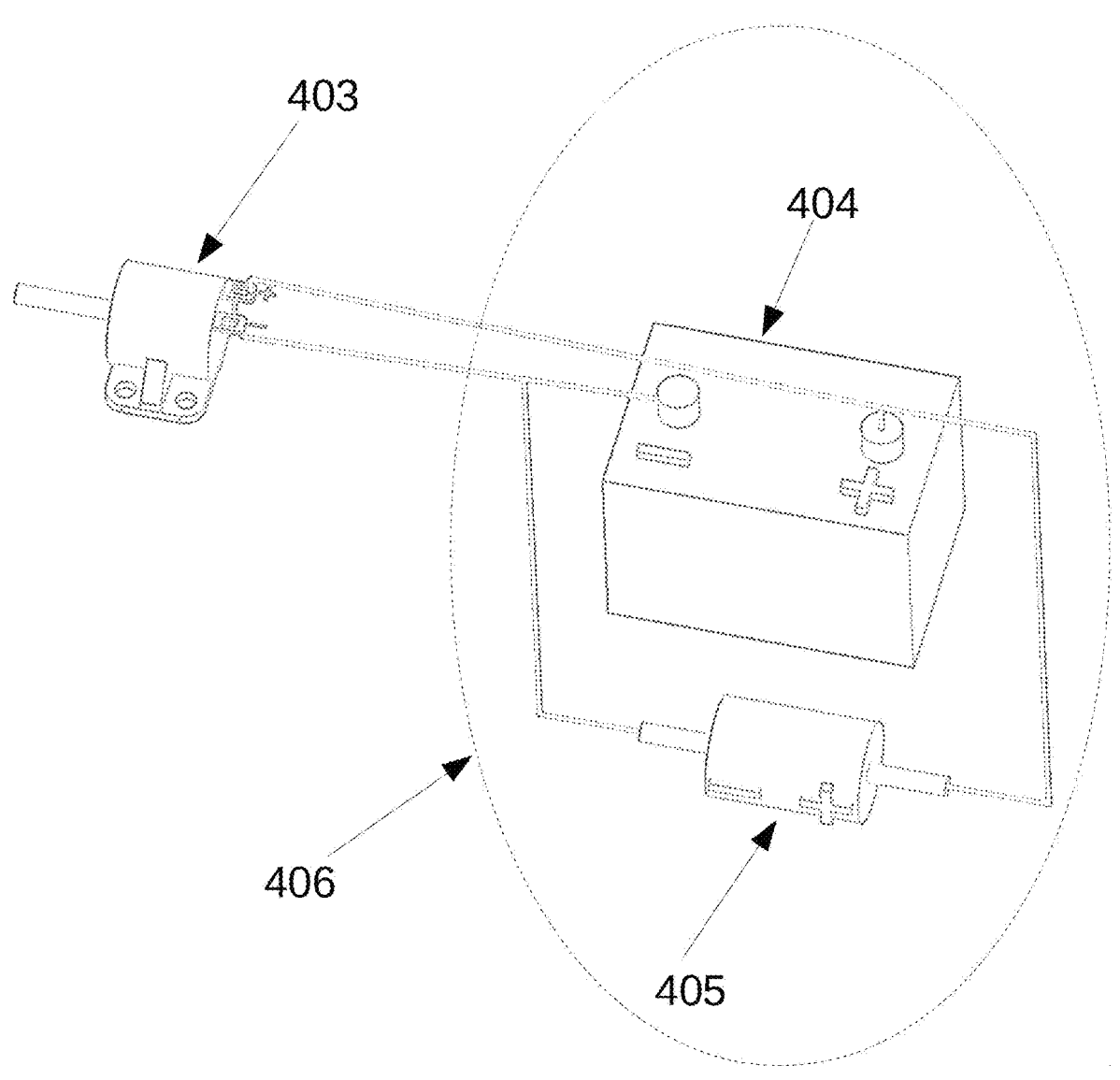
FIG. 14 shows an electric generator electrically coupled to both a battery and a capacitor. Both a battery and a capacitor are embodiments of an electrical energy storage device.
Figure 15:
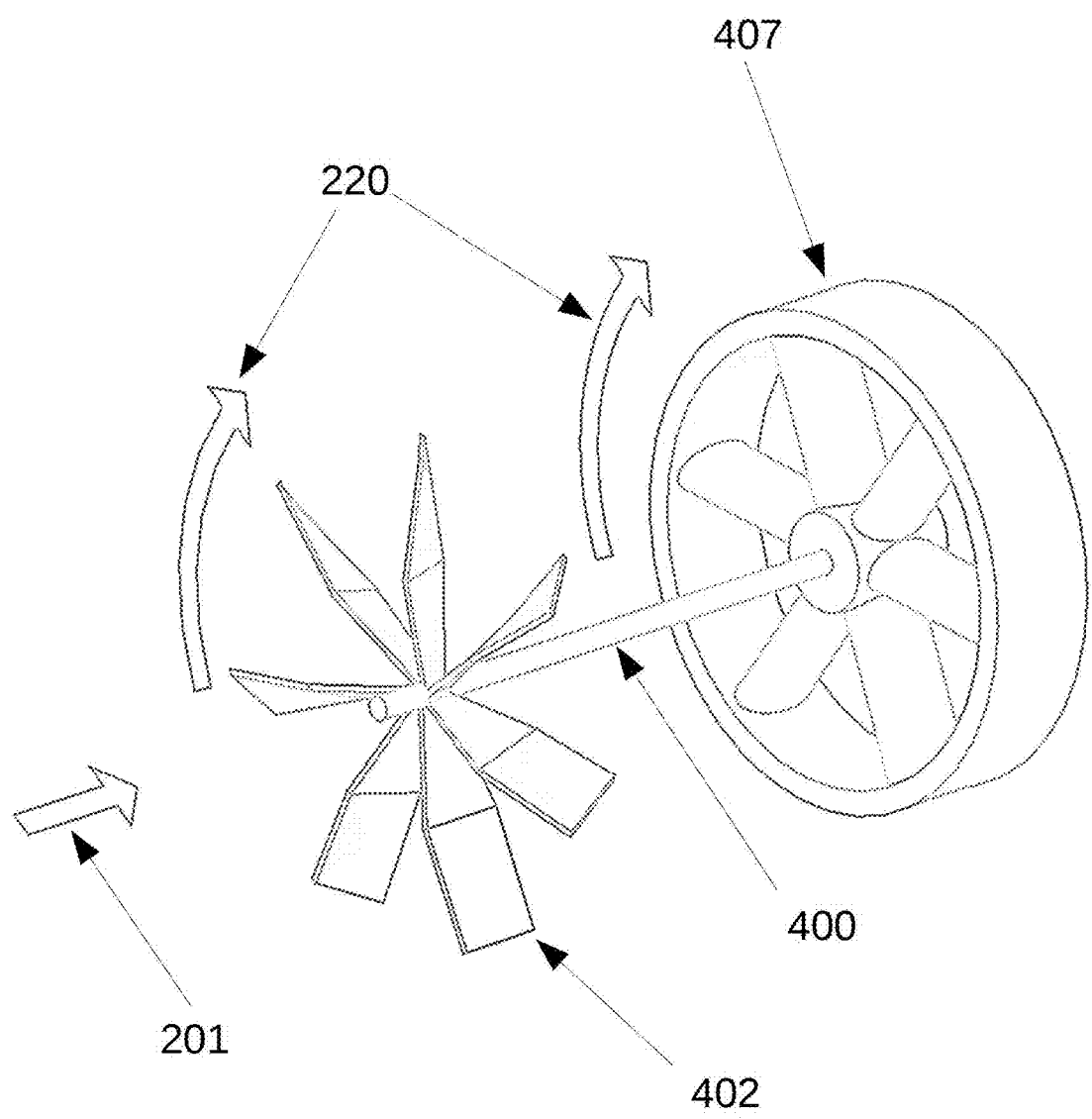
FIG. 15 shows a turbine physically coupled to a flywheel by means of a shaft. Oncoming airflow causes the turbine and, thus, the flywheel to rotate, as shown by the rotation. The rotation of the flywheel stores rotational mechanical energy.
Figure 16:
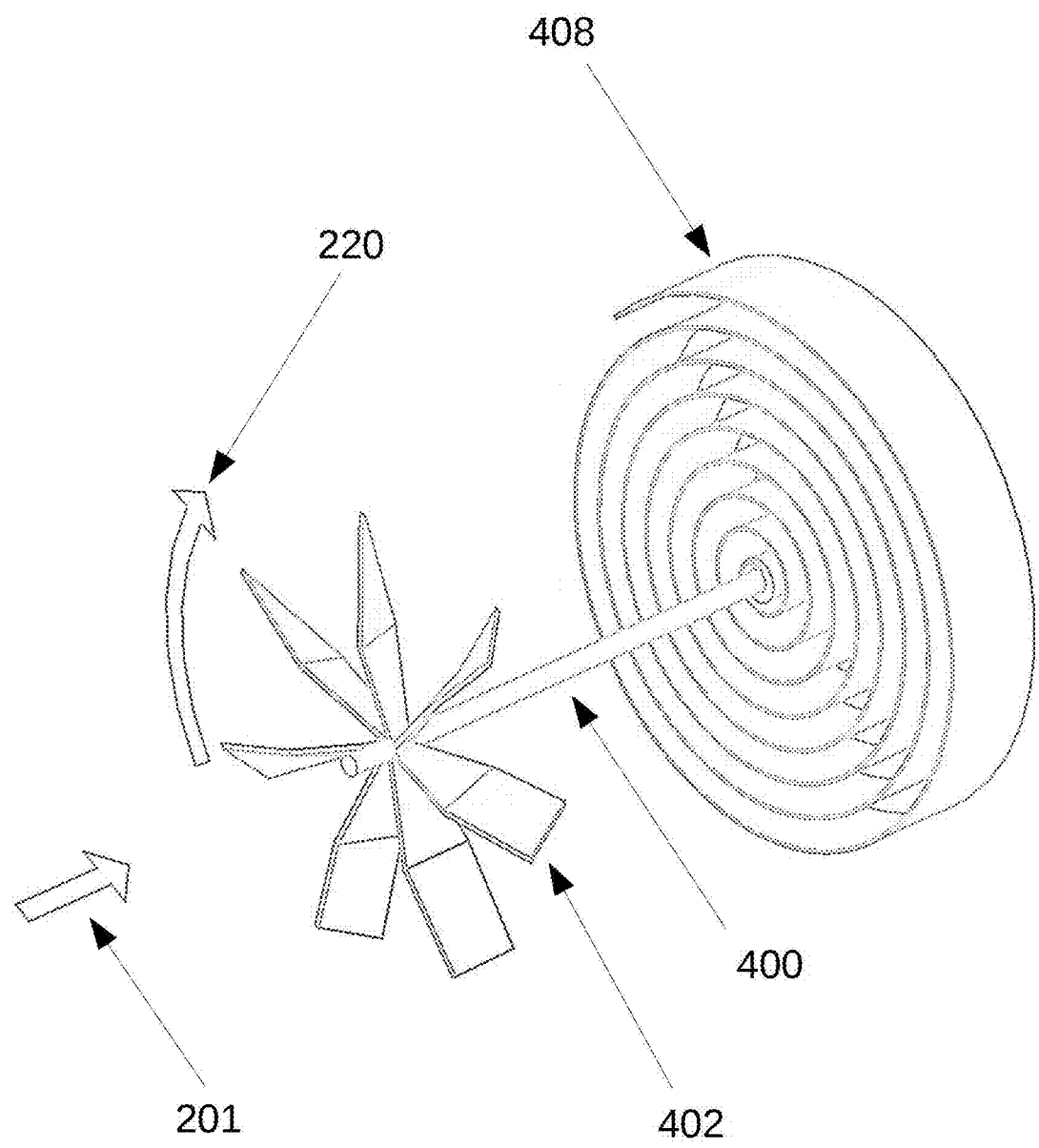
FIG. 16 shows a turbine physically coupled to a spring by means of a shaft. Oncoming airflow causes the turbine and, thus, the spring to rotate, as shown by the rotation. The rotation of the spring compresses it, which stores rotational mechanical energy.
Figure 17:
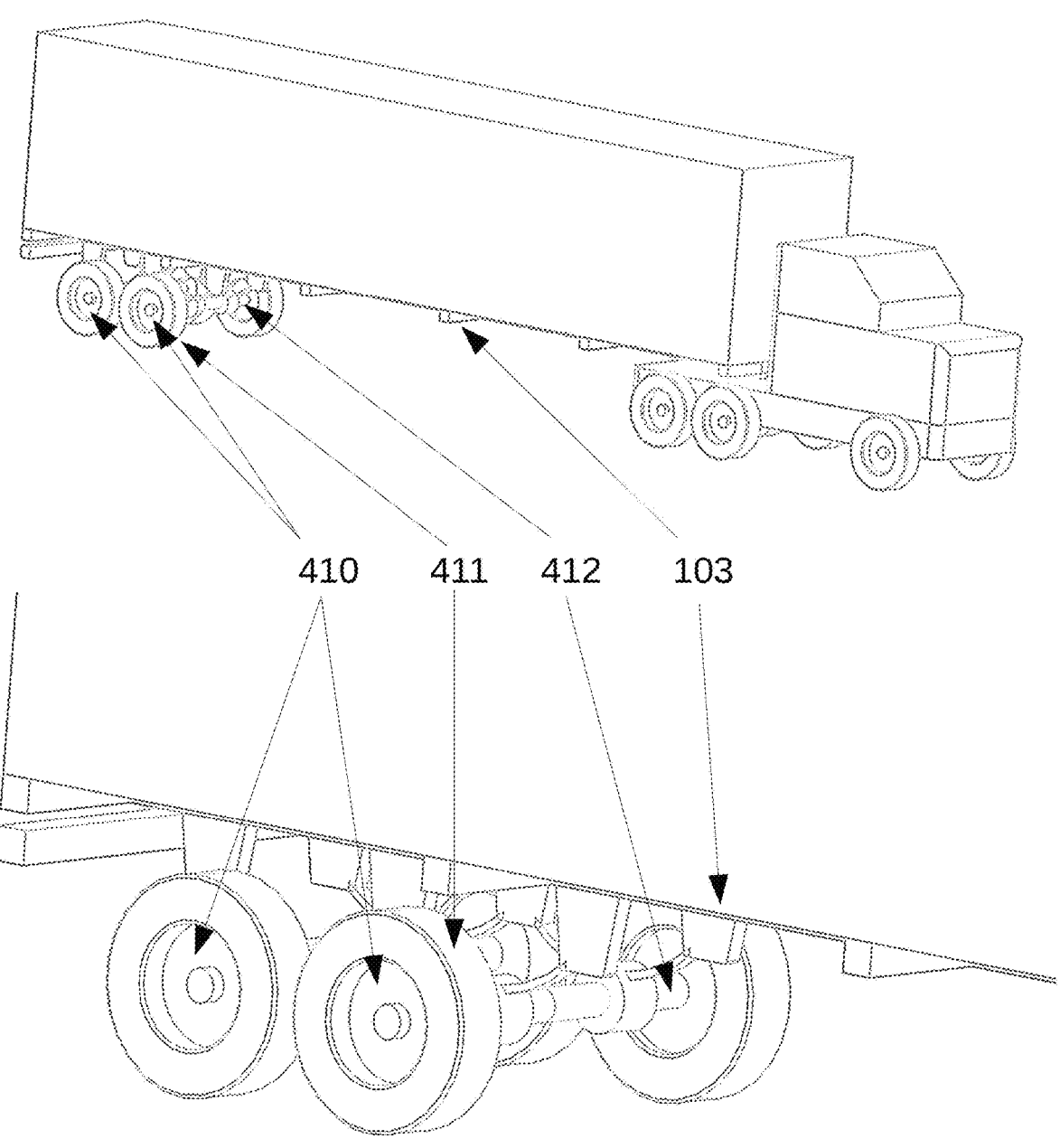
FIG. 17 shows wheels, tires, and axles on a towed transport platform.
Figure 18:
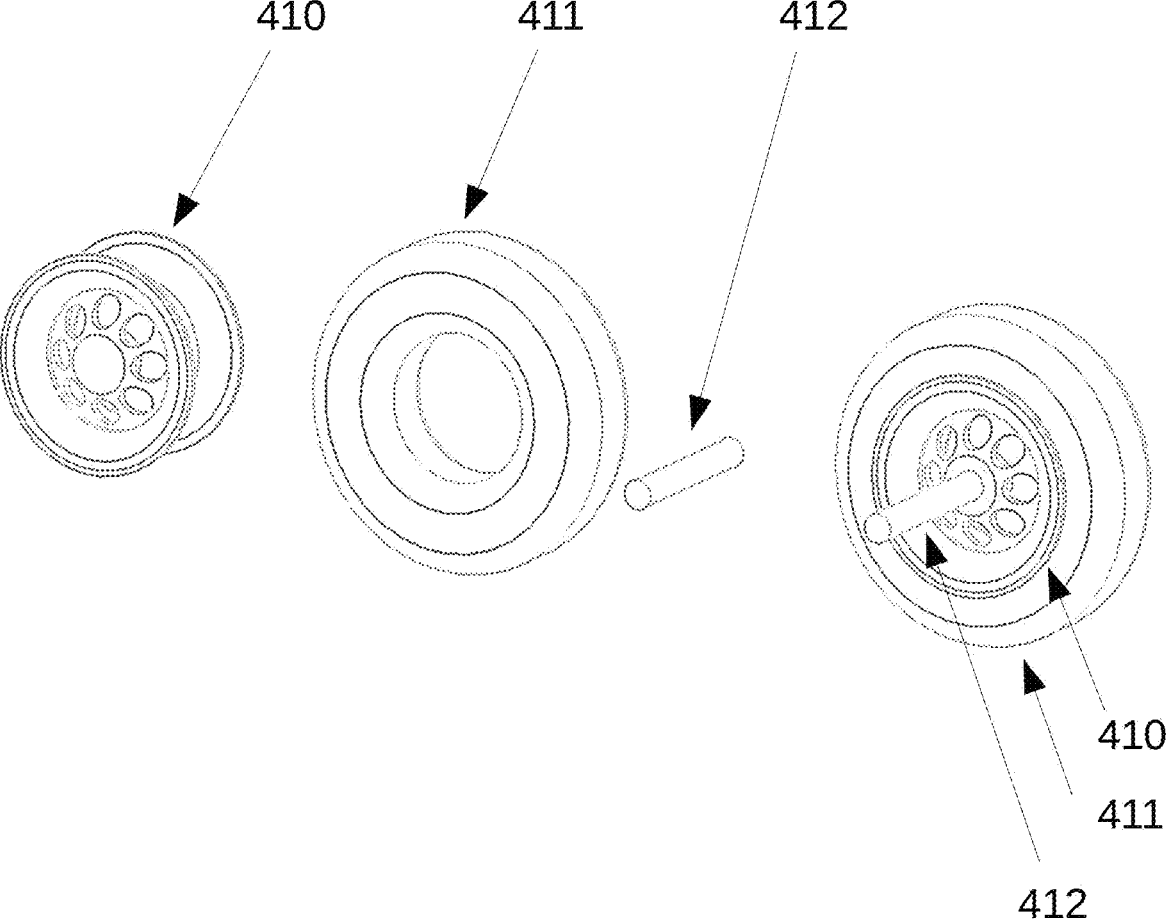
FIG. 18 shows a wheel, a tire, and an axle, as well as all three assembled.
Figure 19:
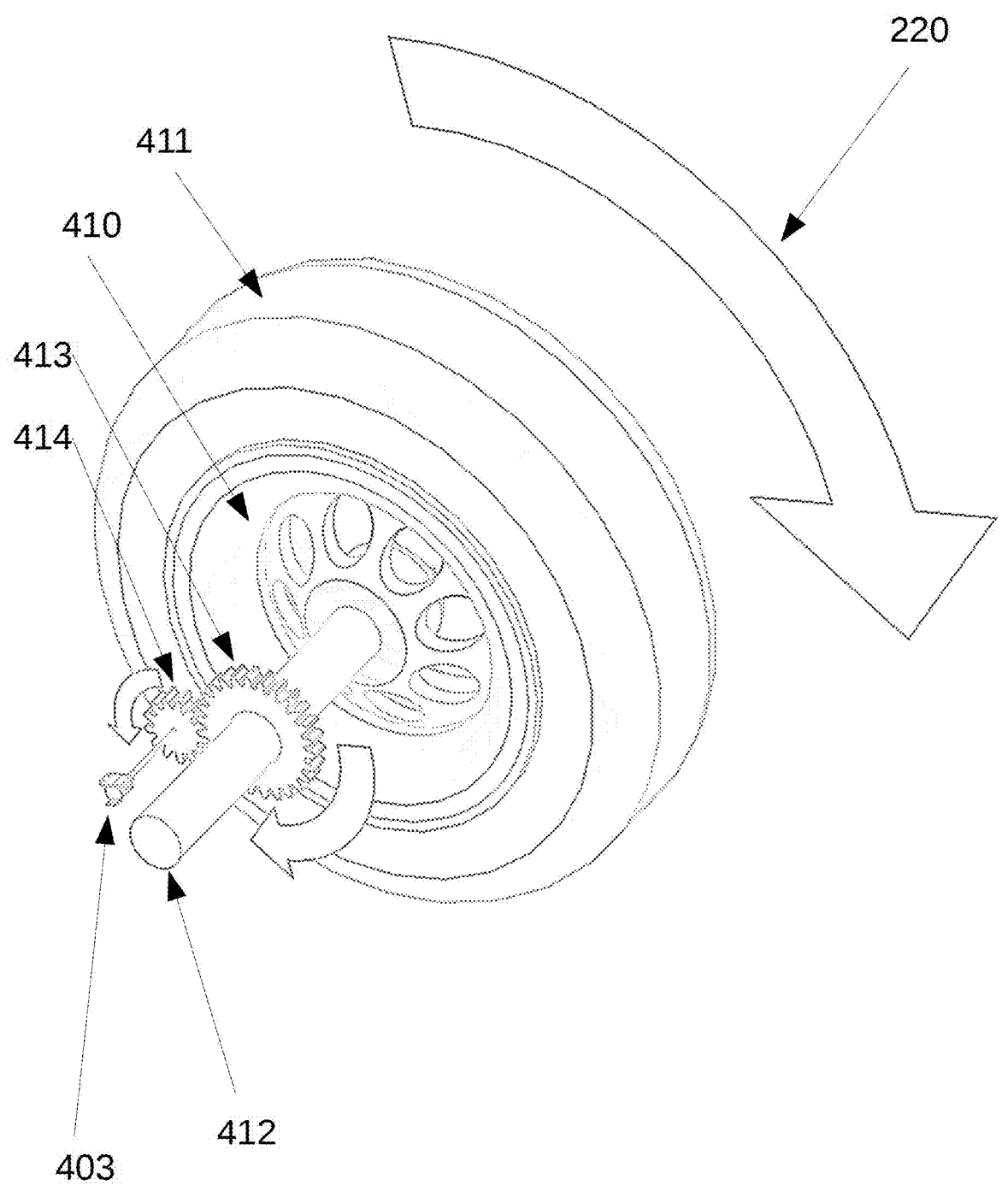
FIG. 19 shows a wheel, tire, and axle assembly physically coupled to a gearing, comprising a large gear and a small gear, which is physically coupled to an electric generator. The direction of wheel rotation is shown.
Figure 20:
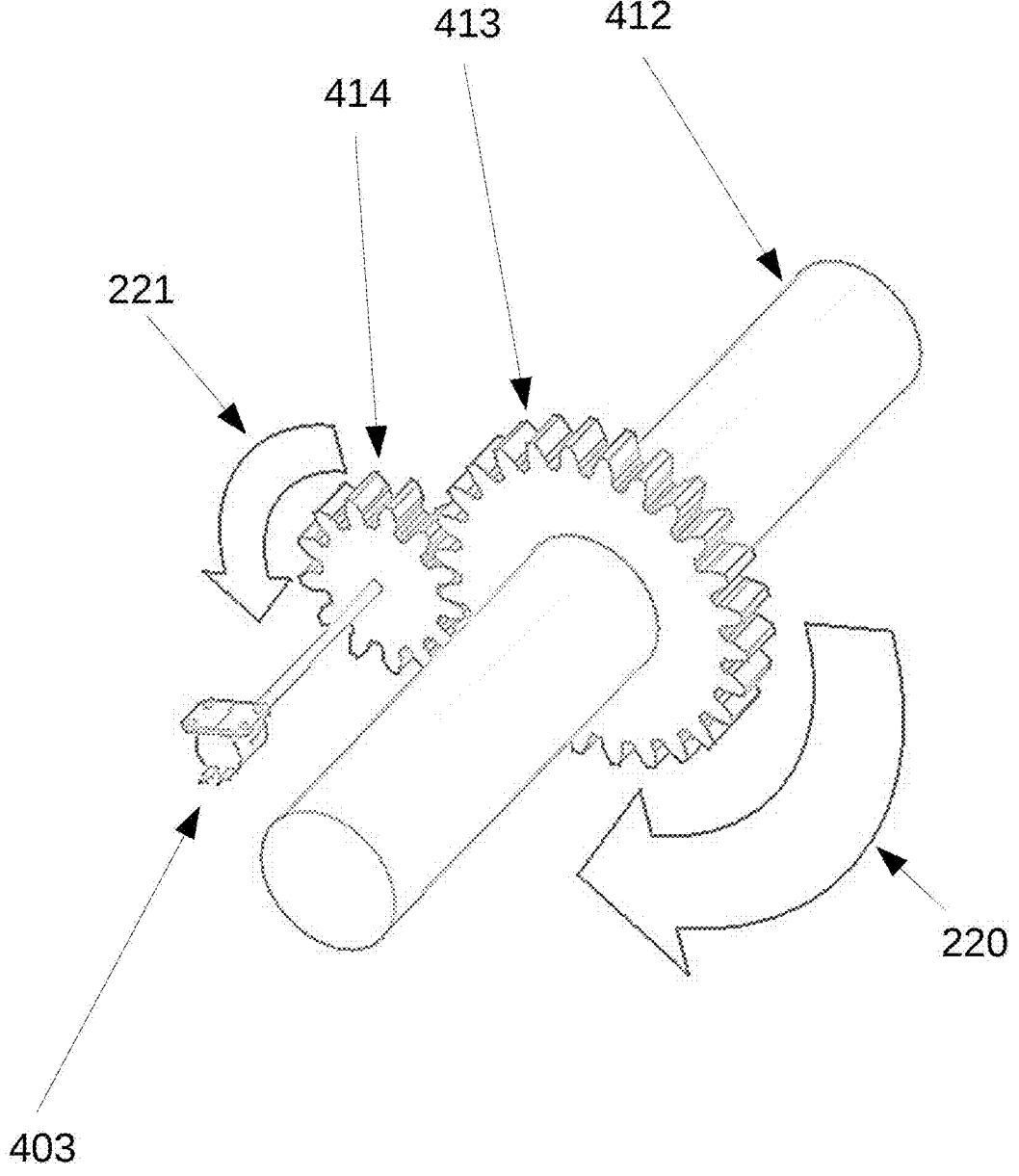
FIG. 20 is a close up of FIG. 19 without a wheel and tire, showing an axle physically coupled to a gearing, comprising a large gear and a small gear, which is physically coupled to an electric generator. The direction of the axle and large gear rotation and the direction of the small gear rotation are shown. The rotation of the axle rotates the gearing, which causes the electric generator to generate electrical power.
Figure 21:
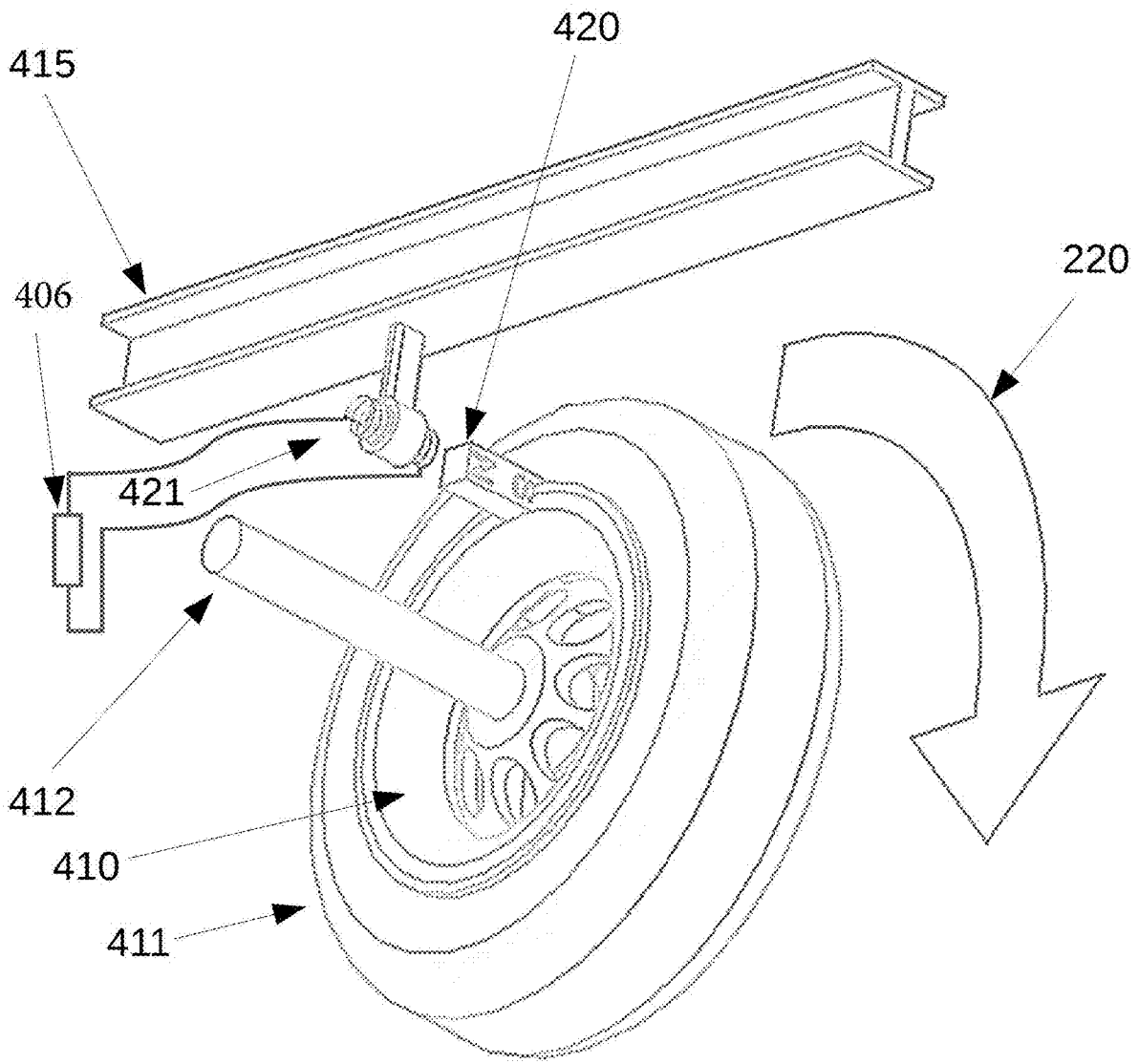
FIG. 21 shows a magnet physically coupled to a wheel, tire, and axle assembly, and an inductor physically coupled to a towed transport platform frame. The direction of wheel rotation is shown. The magnet moves with the wheel, and the inductor remains fixed to the towed transport platform frame.
Figure 22:
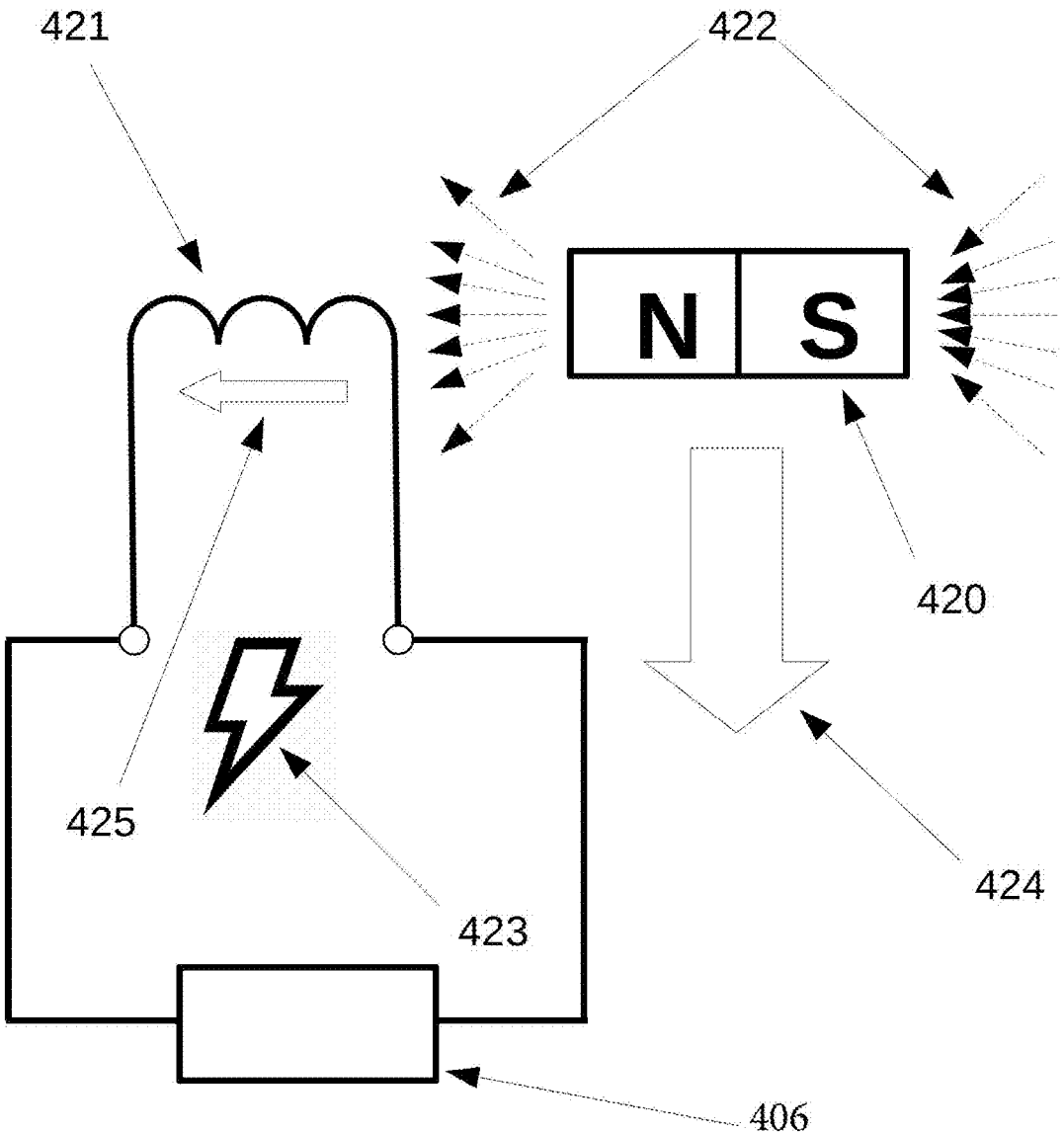
FIG. 22 shows symbolically a magnet and its magnetic flux moving past an inductor, inducing electric current, which generates electrical power.

100 tractor platform
101 chassis
102 intermodal container
103 towed transport platform
104 dry-van trailer
105 load
200 direction of towing
201 airflow
210 direction of loading
211 direction of unloading
212 direction of a tractor platform coupling with a towed transport platform
213 direction of a tractor platform uncoupling from a towed transport platform
220 rotation
221 rotation of a smaller meshed gear

300 roadway
301 geolocation
302 path taken
303 user interface display
400 shaft
401 turbine whose axis of rotation is oriented substantially perpendicular to the direction of motion of airflow, also known as a cross-flow turbine
402 turbine whose axis of rotation is oriented substantially at a fixed angle of 0° to the direction of motion of airflow, also known as an axial turbine
403 electric generator
404 battery
405 capacitor
406 electrical energy storage device
407 flywheel
408 spring
410 wheel
411 tire
412 axle
413 large gear
414 small gear
415 towed transport platform frame
420 magnet
421 inductor
422 magnetic flux
423 electrical power induced by a magnet and its magnetic flux moving past an inductor
424 motion of a magnet and its magnetic flux moving past an inductor
425 electric current flowing through an inductor

DETAILED DESCRIPTION OF THE INVENTION

Some definitions of terms used are as follows.
Coupling Terminology

In one embodiment, if a first physical object is physically coupled to a second physical object and said second physical object is physically coupled to a third physical object, then said first physical object is physically coupled to said third physical object.

In one embodiment, if a first physical object is physically coupled to a second physical object then said second physical object is physically coupled to said first physical object.

In one embodiment, a first physical object is physically coupled to a second physical object and said first physical object may rotate independently of said second physical object.

In one embodiment, a first electronic device is electrically coupled to a second electronic device if said first electronic device can send electrical power to said second electronic device.

In one embodiment, if a first electronic device is electrically coupled to a second electronic device then said second electronic device is electrically coupled to said first electronic device.
Trucking Terminology In one embodiment, a towed transport platform comprises a means for supporting a load and for being towed on a road.

In one embodiment, a towed transport platform comprises a trailer.

In one embodiment, a towed transport platform comprises a semi-trailer.

In one embodiment, a towed transport platform comprises a chassis.

In one embodiment, a tractor platform comprises a motive power source and a means for towing a towed transport platform.

In one embodiment, an intermodal container comprises a standardized shipping container designed and built for intermodal freight transport.

In one embodiment, a chassis comprises a towed transport platform with a means for physically coupling one or more intermodal containers to said towed transport platform.

Energy and Physics Terminology

In one embodiment, kinetic mechanical energy comprises the kinetic energy of a mechanical system.

In one embodiment, kinetic mechanical energy comprises the linear and rotational motion of a mechanical system.

In one embodiment, kinetic mechanical energy comprises the kinetic energy of a mechanical system that is independent of the potential energy of said mechanical system.

In one embodiment, rotational mechanical energy comprises the rotational component of a mechanical system's kinetic mechanical energy.

In one embodiment, mechanical power comprises kinetic mechanical energy expended per unit time.

Power Generation Terminology

In one embodiment, a kinetic motion power generator comprises a means for converting kinetic energy into electrical power.

In one embodiment, a kinetic motion power generator comprises a means for converting kinetic energy from the motion of a towed transport platform into electrical power.

In one embodiment, a dynamo comprises a means for converting kinetic mechanical energy into electrical power.

In one embodiment, a kinetic motion power generator comprises a dynamo.

In one embodiment, an electric generator comprises a means for converting rotational mechanical energy into electrical power.

In one embodiment, an electric generator comprises a means for converting rotation into electrical power.

In one embodiment, a dynamo comprises an electric generator.

In one embodiment, a turbine comprises a means for converting the kinetic energy of a moving fluid into rotational mechanical energy.

In one embodiment, a turbine comprises a means for converting the kinetic energy of airflow resulting from the motion of a towed transport platform into rotational mechanical energy.

In one embodiment, a turbine comprises a means for converting airflow into rotation.

In one embodiment, a turbine electric generator comprises a turbine physically coupled to an electric generator wherein the rotational mechanical energy of said turbine is converted into electrical power by means of said electric generator.

In one embodiment, a dynamo comprises a turbine electric generator.

In one embodiment, a kinetic motion power generator comprises a turbine electric generator.

In one embodiment, a gearing comprises a means for transmitting rotational mechanical energy from one mechanical system to another mechanical system.

In one embodiment, a gearing comprises a means for transmitting the rotation of one mechanical system to another mechanical system.

In one embodiment, a geared electric generator comprises an electric generator physically coupled to a gearing that is physically coupled to a rotational mechanical energy source wherein the energy of said rotational mechanical energy source is converted into electrical power by means of said electric generator.

In one embodiment, a rotational mechanical energy source comprises a towed transport platform wheel that rotates when said towed transport platform is in motion.

In one embodiment, a rotating wheel component comprises a wheel, tire, axle, or other component of a wheel that rotates when said wheel rotates.

In one embodiment, a rotating wheel component comprises a rotating wheel component of a towed transport platform wheel.

In one embodiment, a geared electric generator comprises an electric generator physically coupled to a gearing that is physically coupled to a rotating wheel component wherein rotational mechanical energy of said rotating wheel component is converted into electrical power by means of said electric generator.

In one embodiment, a dynamo comprises a geared electric generator.

In one embodiment, a kinetic motion power generator comprises a geared electric generator.

In one embodiment, a magnet comprises a body having the property of attracting iron and producing a magnetic field external to itself.

In one embodiment, a magnet comprises a body producing a magnetic flux external to itself.

In one embodiment, a magnet comprises a means for producing magnetic flux.

In one embodiment, an inductor comprises an electrically conductive material arranged in one or more coils such that a change in magnetic flux along the axis of said coil induces an electric current in said coil.

In one embodiment, an inductor comprises a means for converting changing magnetic flux into electrical power.

In one embodiment, a change in magnetic flux induces electrical power in an inductor.

In one embodiment, a magnet passing by an inductor induces electrical power in said inductor.

In one embodiment, an energy storage device comprises a means for converting power into potential energy and a means for converting said potential energy back into power.

In one embodiment, an electrical energy storage device comprises a means for converting electrical power into potential energy.

In one embodiment, an electrical energy storage device comprises a means for converting electrical power into potential energy and a means for converting said potential energy back into electrical power.

In one embodiment, an electrical energy storage device comprises a battery.

In one embodiment, an electrical energy storage device comprises a capacitor.

In one embodiment, an energy storage device comprises an electrical energy storage device.

In one embodiment, a mechanical energy storage device comprises a means for converting mechanical power into potential energy.

In one embodiment, a mechanical energy storage device comprises a means for converting potential energy into mechanical power.

In one embodiment, a mechanical energy storage device comprises a means for converting mechanical power into potential energy and a means for converting said potential energy into mechanical power.

In one embodiment, a mechanical energy storage device comprises a means for converting rotational mechanical energy into potential energy.

In one embodiment, a mechanical energy storage device comprises a means for converting rotation into potential energy.

In one embodiment, a mechanical energy storage device comprises a spring system comprising one or more springs, a means for converting mechanical power into potential energy stored in said springs and a means for releasing said potential energy back into mechanical power.

In one embodiment, a mechanical energy storage device comprises a flywheel system comprising one or more flywheels, a means for converting mechanical power into rotational mechanical energy stored in said flywheels and a means for releasing said rotational mechanical energy back into mechanical power.

In one embodiment, an energy storage device comprises a mechanical energy storage device.

Geolocation Terminology

In one embodiment, a geolocation comprises the identification or estimation of the real-world geographic location of an object.

In one embodiment, a geolocation comprises a latitude and a longitude.

In one embodiment, a geolocation comprises a latitude, a longitude, and an altitude.

In one embodiment, a geolocation comprises a geographic location expressed in an earth-based coordinate system.

In one embodiment, a geolocation comprises a time measurement.

In one embodiment, a satellite-based radio-navigation system comprises a global navigation satellite system ("GNSS").

In one embodiment, a satellite-based radio-navigation system comprises the United States' Global Positioning System ("GPS").

In one embodiment, a satellite-based radio-navigation system comprises Russia's GLONASS.

In one embodiment, a satellite-based radio-navigation system comprises the European Union's Galileo system.

In one embodiment, a satellite-based radio-navigation system comprises China's BeiDou Navigation Satellite System ("BDS").

In one embodiment, a satellite-based radio-navigation system comprises India's IRNSS.

In one embodiment, a satellite-based radio-navigation system comprises Japan's QZSS.

In one embodiment, a geolocation is measured by means of one or more satellite-based radio-navigation systems.

In mathematics, a hyperbola is defined as the set of points such that for any point P of the set, the absolute difference of the distances from P to two fixed points is constant.

In one embodiment, a geolocation hyperbola comprises a hyperbola wherein said two fixed points are the geolocations of two stations broadcasting radio signals.

In one embodiment, a means for constructing a geolocation hyperbola of the set of possible geolocations of a radio receiver comprises measuring the time delay of a signal sent from each broadcasting station to said radio receiver within an interval of time and calculating the absolute difference of the distances from said radio receiver to said broadcasting stations as the difference in said time delays multiplied by the speed of light.

In one embodiment, a multilateration algorithm comprises a means for measuring the geolocation of a radio receiver calculated as the intersection of two geolocation hyperbolas for said radio receiver wherein said two geolocation hyperbolas are calculated using no fewer than three broadcasting stations.

In one embodiment, a multilateration algorithm comprises a means for measuring a geolocation based on measurements of the distance to three or more stations at known geolocations by broadcast signals at known times, wherein said geolocation is calculated by means of triangulation.

In one embodiment, a geolocation is measured by means of a multilateration algorithm wherein said stations are cellular phone towers.

In one embodiment, a multilateration navigation system comprises means for determining a geolocation by means of a multilateration algorithm.

In one embodiment, a navigation system comprises a means for reading one or more geolocations by means of either a satellite-based radio-navigation system or a multilateration navigation system.

In one embodiment, a navigation system comprises a plurality of navigation systems.

In one embodiment, a navigation system comprises a means for reading one or more geolocations by means of a plurality of satellite-based radio-navigation systems and multilateration navigation systems.

State and Event Terminology

In one embodiment, a towed transport platform state comprises a state of a towed transport platform.

In one embodiment, a towed transport platform state comprises a state of a towed transport platform at a given point in time.

In one embodiment, a towed transport platform state comprises the geolocation of a towed transport platform.

In one embodiment, a towed transport platform state comprises whether or not a towed transport platform is physically coupled to a tractor platform.

In one embodiment, a towed transport platform state comprises whether or not a towed transport platform is electrically coupled to a tractor platform.

In one embodiment, a towed transport platform state comprises whether or not an intermodal container is physically coupled to a chassis.

In one embodiment, a towed transport platform state comprises whether a door physically coupled to said towed transport platform is open or closed.

In one embodiment, a towed transport platform state comprises whether or not said towed transport platform is moving.

In one embodiment, a towed transport platform state comprises whether or not cellular network jamming is being detected at said towed transport platform's location.

In one embodiment, a towed transport platform event comprises a change in a towed transport platform state.

In one embodiment, a towed transport platform event comprises said towed transport platform transitioning between a stationary state and moving state.

In one embodiment, a towed transport platform event comprises a change in the geolocation of said towed transport platform.

In one embodiment, a towed transport platform event comprises an impact of said towed transport platform with another physical object.

In one embodiment, a towed transport platform event comprises said towed transport platform undergoing an unusual rotation.

In one embodiment, a towed transport platform event comprises the physical connection of said towed transport platform to a tractor platform.

In one embodiment, a towed transport platform event comprises the physical disconnection of said towed transport platform from a tractor platform.

In one embodiment, a towed transport platform event comprises the electrical connection of said towed transport platform to a tractor platform.

In one embodiment, a towed transport platform event comprises the electrical disconnection of said towed transport platform from a tractor platform.

In one embodiment, a towed transport platform event comprises the physical coupling of an intermodal container to a chassis.

In one embodiment, a towed transport platform event comprises the physical uncoupling of an intermodal container from a chassis.

In one embodiment, a towed transport platform event comprises the opening or closing of a door physically coupled to said towed transport platform.

In one embodiment, a towed transport platform event comprises the starting or ending of cellular network jamming in the vicinity of said towed transport platform at said towed transport platform's location.

Monitoring System Terminology

In one embodiment, a monitoring system comprises a means for reading a towed transport platform state.

In one embodiment, a monitoring system comprises a means for recording a towed transport platform state.

In one embodiment, a monitoring system comprises a means for transmitting a towed transport platform state.

In one embodiment, a monitoring system comprises a means for detecting a towed transport platform event.

In one embodiment, a monitoring system comprises a means for recording a towed transport platform event.

In one embodiment, a monitoring system comprises a means for transmitting a towed transport platform event.

In one embodiment, a monitoring system is physically coupled to a towed transport platform.

In one embodiment, a computational device comprises a means for manipulating electronic signals and executing algorithms.

First Embodiment

Description

The first embodiment comprises a machine for generating electrical power from the airflow of a moving towed transport platform. This machine comprises a turbine physically coupled to an electric generator that is physically coupled to said towed transport platform.

Operation

In the first embodiment, when said towed transport platform is in motion, the resulting airflow causes said turbine to rotate which, in turn, causes said electric generator to generate electrical power.

Second Embodiment

Description

The second embodiment comprises the first embodiment and an electrical energy storage device electrically coupled to said electric generator. The second embodiment converts said electrical power into potential energy.

Operation

The operation of the second embodiment comprises said electrical energy storage device converting said electrical power into said potential energy.

Third Embodiment

Description

The third embodiment comprises the first embodiment and a mechanical energy storage device physically coupled to said turbine. The third embodiment converts said rotation of said turbine into potential energy.

Operation

The operation of the third embodiment comprises said mechanical energy storage device converting said rotation of said turbine into said potential energy.

Fourth Embodiment

Description

The fourth embodiment comprises the first embodiment wherein said turbine's axis of rotation is oriented substantially perpendicular to the direction of motion of said airflow. Said airflow causes the rotation of said turbine.

Operation

In the fourth embodiment, when said towed transport platform is in motion, the resulting airflow, substantially perpendicular to said turbine's axis of rotation, causes said turbine to rotate which, in turn, causes said electric generator to generate electrical power.

Fifth Embodiment

Description

The fifth embodiment comprises the first embodiment wherein said turbine's axis of rotation is oriented substantially at a fixed angle to the direction of motion of said airflow. Said airflow causes the rotation of said turbine.

Operation

In the fifth embodiment, when said towed transport platform is in motion, the resulting airflow, substantially at a fixed angle to said turbine's axis of rotation, causes said turbine to rotate which, in turn, causes said electric generator to generate electrical power.

Sixth Embodiment

Description

The sixth embodiment comprises a machine for generating electrical power from the motion of a towed transport platform. This machine comprises a rotating wheel component physically coupled to said towed transport platform, a gearing physically coupled to said rotating wheel component and an electric generator physically coupled to said gearing.

Operation

In the sixth embodiment, when said towed transport platform is in motion, this causes the rotation of said rotating wheel component, said gearing transmits said rotation to said electric generator, and said electric generator converts said transmitted rotation into said electrical power.

Seventh Embodiment

Description

The seventh embodiment comprises the sixth embodiment and an electrical energy storage device electrically coupled to said electric generator. The seventh embodiment converts said electrical power into potential energy.

Operation

The operation of the seventh embodiment comprises said electrical energy storage device converting said electrical power into said potential energy.

Eighth Embodiment

Description

The eighth embodiment comprises the sixth embodiment and a mechanical energy storage device physically coupled to said gearing. The eighth embodiment converts said rotation of said rotating wheel component into potential energy.

Operation

The operation of the eighth embodiment comprises said gearing transmitting said rotation of said rotating wheel component to said mechanical energy storage device, which converts said transmitted rotation into said potential energy.

Ninth Embodiment

Description

The ninth embodiment comprises the sixth embodiment wherein said rotating wheel component comprises an axle of said towed transport platform.

Operation

In the ninth embodiment, when said towed transport platform is in motion, this causes the rotation of said axle, said gearing transmits said rotation to said electric generator, and said electric generator converts said transmitted rotation into said electrical power.

Tenth Embodiment

Description

The tenth embodiment comprises the sixth embodiment wherein said rotating wheel component comprises a wheel of said towed transport platform.

Operation

In the tenth embodiment, when said towed transport platform is in motion, this causes the rotation of said wheel, said gearing transmits said rotation to said electric generator, and said electric generator converts said transmitted rotation into said electrical power.

Eleventh Embodiment

Description

The eleventh embodiment comprises the sixth embodiment wherein said rotating wheel component comprises a tire of said towed transport platform.

Operation

In the eleventh embodiment, when said towed transport platform is in motion, this causes the rotation of said tire, said gearing transmits said rotation to said electric generator, and said electric generator converts said transmitted rotation into said electrical power.

Twelfth Embodiment

Description

The twelfth embodiment comprises a machine for generating electrical power from the motion of a towed transport platform. This machine comprises a rotating wheel component physically coupled to said towed transport platform, a magnet physically coupled to said rotating wheel component, and an inductor physically coupled to said towed transport platform.

Operation

In the twelfth embodiment, when said towed transport platform is in motion, this causes the rotation of said rotating wheel component, which causes said magnet to pass by said inductor, which induces said electrical power in said inductor.

Thirteenth Embodiment

Description

The thirteenth embodiment comprises the twelfth embodiment and an electrical energy storage device electrically coupled to said inductors. The thirteenth embodiment converts said electrical power into potential energy.

Operation

The operation of the thirteenth embodiment comprises said electrical energy storage device converting said electrical power into said potential energy.

Fourteenth Embodiment

Description

The fourteenth embodiment comprises the twelfth embodiment, a gearing physically coupled to said rotating wheel component and a mechanical energy storage device physically coupled to said gearing. The fourteenth embodiment converts said rotation of said rotating wheel component into potential energy.

Operation

The operation of the fourteenth embodiment comprises said gearing transmitting said rotation of said rotating wheel component to said mechanical energy storage device and said mechanical energy storage device converting said transmitted rotation into said potential energy.

Fifteenth Embodiment

Description

The fifteenth embodiment comprises the twelfth embodiment wherein said rotating wheel component comprises an axle of said towed transport platform.

Operation

In the fifteenth embodiment, when said towed transport platform is in motion, this causes the rotation of said axle, which causes said magnet to pass by said inductor, which induces said electrical power in said inductor.

Sixteenth Embodiment

Description

The sixteenth embodiment comprises the twelfth embodiment wherein said rotating wheel component comprises a wheel of said towed transport platform.

Operation

In the sixteenth embodiment, when said towed transport platform is in motion, this causes the rotation of said wheel, which causes said magnet to pass by said inductor, which induces said electrical power in said inductor.

Seventeenth Embodiment

Description

The seventeenth embodiment comprises the twelfth embodiment wherein said rotating wheel component comprises a tire of said towed transport platform.

Operation

In the seventeenth embodiment, when said towed transport platform is in motion, this causes the rotation of said tire, which causes said magnet to pass by said inductor, which induces said electrical power in said inductor.

Eighteenth Embodiment

Description

The eighteenth embodiment comprises a method for generating electrical power from the motion of a moving towed transport platform. This embodiment utilizes a magnet and an inductor.

Operation

When said towed transport platform is in motion, said magnet to passes by said inductor, inducing said electrical power in said inductor.

Nineteenth Embodiment

Figure 23:
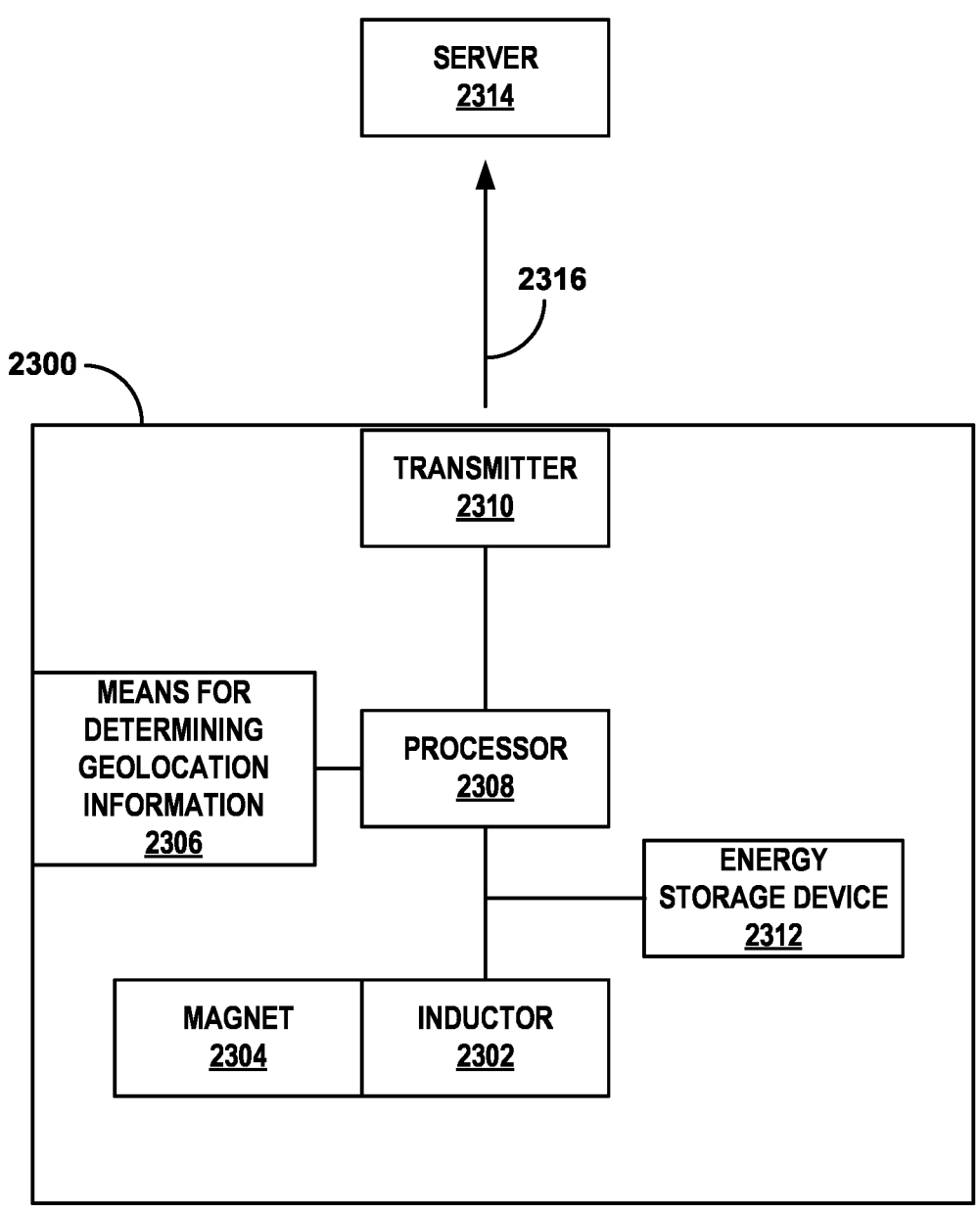
FIG. 23 shows a block diagram of an example of a monitoring system configured to monitor a shipping container. The monitoring system induces electrical power from the movement of a transport platform to which the shipping container is coupled, determines and logs geolocation information of the shipping container, and transmits at least a portion of the determined geolocation information to a server.

FIG. 23 shows a block diagram of an example of a monitoring system configured to monitor a shipping container. The monitoring system induces electrical power from the movement of a transport platform to which the shipping container is coupled, determines and logs geolocation information of the shipping container, and transmits at least a portion of the determined geolocation information to a server. In the example shown in FIG. 23, monitoring system 2300 is configured to monitor a shipping container. Monitoring system 2300 comprises inductor 2302 and magnet 2304 disposed such that relative movement between magnet 2304 and inductor 2302 caused by movement of a transport platform to which the shipping container is coupled induces electrical power. Monitoring system 2300 further comprises means for determining geolocation information 2306 of the shipping container. Monitoring system 2300 also comprises processor 2308 electrically coupled to inductor 2302. In the example shown in FIG. 23, processor 2308 is configured to log a set of the determined geolocation information of the shipping container. Monitoring system 2300 additionally comprises transmitter 2310, which is configured to transmit, via transmission 2316, at least a portion of the set of determined geolocation information to server 2314. In the example shown in FIG. 23, transmission 2316 is a cellular transmission. Monitoring system 2300 further comprises energy storage device 2312 coupled to inductor 2302. Energy storage device 2312 is configured to store excess electrical energy during a first time period and to provide the stored electrical energy to monitoring system 2300 during a second time period.

What is claimed is:

1. A monitoring system configured to monitor a shipping container, the monitoring system comprising:

an inductor;

a magnet disposed such that relative movement between the magnet and the inductor caused by movement of a transport platform to which the shipping container is coupled induces electrical power, the relative movement between the magnet and the inductor caused by rotation of a rotating wheel component of the transport platform, the relative movement between the magnet and the inductor not caused by airflow turning a turbine;

means for determining geolocation information of the shipping container;

a processor electrically coupled to the inductor, the processor configured to log a set of the determined geolocation information of the shipping container;

a transmitter configured to transmit at least a portion of the set of determined geolocation information to a server; and an energy storage device coupled to the inductor, the energy storage device configured to store excess electrical energy during a first time period and to provide the stored electrical energy to the monitoring system during a second time period.

2. The monitoring system of claim 1, wherein the transport platform is a towed transport platform.

3. The monitoring system of claim 1, wherein the shipping container comprises an intermodal container.

4. The monitoring system of claim 1, wherein the movement of the transport platform is periodic movement of the transport platform.

5. The monitoring system of claim 4, wherein the periodic movement of the transport platform is vibration.

6. The monitoring system of claim 4, wherein the periodic movement of the transport platform is swaying.

7. The monitoring system of claim 1, wherein the means for determining geolocation information comprises a module configured to determine the geolocation information by means of a satellite-based radio navigation system.

8. The monitoring system of claim 1, wherein the means for determining geolocation information comprises a radio receiver configured to determine the geolocation information by means of a multilateration algorithm.

9. The monitoring system of claim 1, wherein the rotating wheel component comprises a wheel.

10. The monitoring system of claim 1, wherein the rotating wheel component comprises an axle.

11. The monitoring system of claim 1, wherein the rotating wheel component comprises a tire.

\* \* \* \* \*